United States Patent
Good et al.

(10) Patent No.: US 9,142,201 B2
(45) Date of Patent: Sep. 22, 2015

(54) DISTRIBUTION OF AUDIO SHEET MUSIC WITHIN AN ELECTRONIC BOOK

(71) Applicant: MakeMusic, Inc., Eden Prairie, MN (US)

(72) Inventors: Michael Good, Los Altos, CA (US); Steve Mills, Shorewood, MN (US)

(73) Assignee: MakeMusic, Inc., Boulder, CO (US)

( * ) Notice: Subject to any disclaimer, the term of this patent is extended or adjusted under 35 U.S.C. 154(b) by 0 days.

(21) Appl. No.: 14/560,854

(22) Filed: Dec. 4, 2014

(65) Prior Publication Data

US 2015/0082972 A1     Mar. 26, 2015

Related U.S. Application Data

(62) Division of application No. 13/486,582, filed on Jun. 1, 2012, now Pat. No. 8,933,312.

(51) Int. Cl.
| | |
|---|---|
| G10H 1/18 | (2006.01) |
| G09B 15/04 | (2006.01) |
| G09B 15/02 | (2006.01) |
| G09B 15/00 | (2006.01) |

(52) U.S. Cl.
CPC ............. G10H 1/18 (2013.01); G09B 15/003 (2013.01); G09B 15/02 (2013.01); G09B 15/04 (2013.01)

(58) Field of Classification Search
USPC .......................................................... 84/649
IPC .......................................................... G10H 1/18
See application file for complete search history.

(56) References Cited

U.S. PATENT DOCUMENTS

| | | | | | |
|---|---|---|---|---|---|
| 4,350,070 | A | * | 9/1982 | Bahu | 84/612 |
| 5,604,322 | A | * | 2/1997 | Kikuchi | 84/477 R |
| 5,690,496 | A | * | 11/1997 | Kennedy | 434/307 R |
| 5,883,325 | A | * | 3/1999 | Peirce | 84/615 |
| 6,414,231 | B1 | * | 7/2002 | Miyamoto et al. | 84/477 R |
| 6,740,802 | B1 | * | 5/2004 | Browne, Jr. | 84/609 |
| 7,019,204 | B2 | * | 3/2006 | Terada | 84/601 |
| 7,239,320 | B1 | * | 7/2007 | Hall et al. | 345/473 |
| 8,275,203 | B2 | * | 9/2012 | Hori et al. | 382/181 |
| 8,338,684 | B2 | * | 12/2012 | Pillhofer et al. | 84/470 R |
| 8,527,859 | B2 | * | 9/2013 | Henshall et al. | 715/204 |

(Continued)

OTHER PUBLICATIONS

EPUB 3 Overview, Recommended Specification Oct. 11, 2011 http://www.idpf.org/epub/30/spec/epub30-overview.html, pp. 1-25.

(Continued)

*Primary Examiner* — David Warren
(74) *Attorney, Agent, or Firm* — Fredrikson & Byron, P.A.

(57) ABSTRACT

A method of providing synchronized content to a user including: (i) an audio recording of a voice reading written language text and an audio recording of one or more pieces of music; (ii) written language text and music notation content, having elements that can be identified, displayed, and highlighted, the elements representing discrete segments of the written language and music notation content, each of the discrete segments having a beginning and end; and (iii) synchronization data marking beginning and end points in the audio recordings for each element. The method is implemented such that a user may play the audio recording of a voice reading the written language text, and the audio recording of the one or more pieces of music according to the EPUB format, and display the written language text and music notation content according to the EPUB format with synchronization.

7 Claims, 8 Drawing Sheets

(56) References Cited

U.S. PATENT DOCUMENTS

| | | | | |
|---|---|---|---|---|
| 8,552,281 | B1* | 10/2013 | Cotrone | 84/477 R |
| 8,629,342 | B2* | 1/2014 | Lee et al. | 84/610 |
| 2001/0022127 | A1* | 9/2001 | Chiurazzi et al. | 84/47 |
| 2003/0200858 | A1* | 10/2003 | Xie | 84/609 |
| 2004/0069117 | A1* | 4/2004 | Akins | 84/486 |
| 2008/0314229 | A1* | 12/2008 | Robledo | 84/483.2 |
| 2010/0263517 | A1* | 10/2010 | Robledo | 84/483.2 |
| 2011/0023688 | A1* | 2/2011 | Daisy | 84/483.1 |
| 2011/0261030 | A1* | 10/2011 | Bullock | 345/204 |
| 2012/0131427 | A1* | 5/2012 | Artin | 715/201 |
| 2012/0137246 | A1* | 5/2012 | Pyo | 715/776 |
| 2012/0151577 | A1* | 6/2012 | King et al. | 726/21 |
| 2012/0221436 | A1* | 8/2012 | Patterson et al. | 705/26.41 |
| 2012/0221936 | A1* | 8/2012 | Patterson et al. | 715/230 |
| 2012/0240036 | A1* | 9/2012 | Howard et al. | 715/251 |
| 2012/0310649 | A1* | 12/2012 | Cannistraro et al. | 704/260 |
| 2013/0013991 | A1* | 1/2013 | Evans | 715/206 |
| 2013/0042746 | A1* | 2/2013 | Shau | 84/483.1 |
| 2013/0095864 | A1* | 4/2013 | Marovets | 455/466 |
| 2013/0133506 | A1* | 5/2013 | Daisy | 84/455 |
| 2013/0319209 | A1* | 12/2013 | Good et al. | 84/483.2 |
| 2013/0334300 | A1* | 12/2013 | Evans | 235/375 |
| 2013/0346838 | A1* | 12/2013 | Henshall et al. | 715/203 |

OTHER PUBLICATIONS

EPUB3 Standard. http://idpf.org/epub/30. Retrieved Jun. 28, 2014.
EPUB Content Documents 3.0 Recommended Specification Oct. 11, 2011 http://www.idpf.org/epub/30/spec/epub30-contentdocs-20111011.html.
EPUB Media Overlays 3.0 Recommended Specification Oct. 11, 2011 http://www.idpf.org/epub/30/spec/epub30-mediaoverlays.html, pp. 1-37.
Fremerey et al., Handling Repeats and Jumps in Score-Performance Synchronization, 11th International Society for Music Information Retrieval Conference (ISMIR 2010), pp. 243-248.
Kurth et al., Automated Synchronization of Scanned Sheet Music with Audio Recordings, Bonn University, Dept. of Computer Science III, Austrian Computer Society 2007 (6 pages).
Muller, Meinard, Information Retrieval for Music and Motion, Berlin: Springer-Verlag, 2007, Abstract (1 page).
Muller, Meinard, Information Retrieval for Music and Motion, Berlin: Springer-Verlag, 2007, Chapter 5 on Music Synchronization from the Muller book, pp. 85-108.
Scalable Vector Graphics (SVG) 1.1 (Second Edition) W3C Recommendation Aug. 16, 2011 http://www.w3.org/TR/2011/REC-SVG11-20110816/, pp. 1-4.
Synchronized Multimedia Integration Language (SMIL 3.0) W3C Recommendation Dec. 1, 2008 http://www.w3.org/TR/2008/REC-SMIL3-20081201/, pp. 1-22.

\* cited by examiner

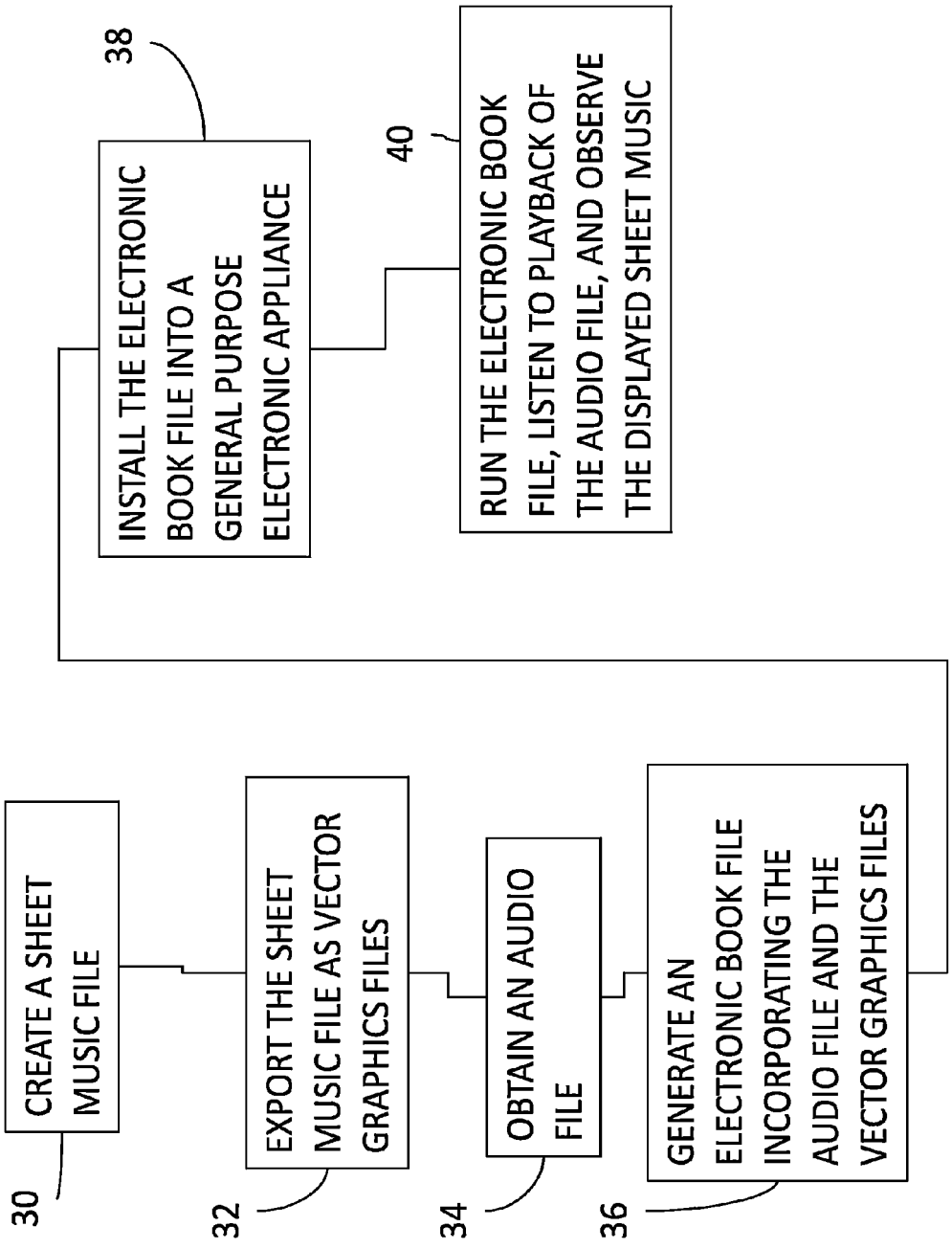

DISTRIBUTION OF AUDIO SHEET MUSIC WITHIN AN ELECTRONIC BOOK

This application is a divisional of U.S. patent application Ser. No. 13,486,582 filed Jun. 1, 2012, the entire contents of which are incorporated herein by reference.

FIELD OF THE ART

The present subject matter generally relates to the field of tools and methods for music presentation for entertainment and education. The disclosure pertains to electronic appliances for digital sheet music display and music audio playback, and has applicability, for instance, to music education.

BACKGROUND

As the music publishing industry has adopted new technology, sheet music has evolved into paperless digital formats. Rather than print musical scores and produce books of music, different sheet music providers have developed software that displays musical score data on a computer screen. The growth of the Internet led to the modern era of digital sheet music, beginning with the 1997 Sunhawk Solero and SheetMusicDirect web-based systems. Since then, Music-Notes, Sibelius, MusicRain/Legato, and others have also entered the market, while FreeHand Systems acquired Sunhawk in 2003.

With the release of electronic book or tablet appliances such as the iPad, many different digital sheet music software applications (hereinafter "apps") have entered the market. The first of these apps displayed digital sheet music as stored in Portable Document Format (PDF) files. Soon afterwards these programs added the ability to annotate the sheet music with graphical markings. Also, they added the capability, for use with suitable hardware platforms, to play an audio file while displaying the sheet music.

Later generations of iPad apps added more interactivity. The NoteStar app from Yamaha allows musicians to listen to music playing back in synchrony with a scrolling digital sheet music display with automatic system and page updating.

Nevertheless, despite recent advancement, little has been done to adapt existing electronic publication tools to fit the growing portable media device market. Most of the current generation of digital sheet music apps only work on the iPad and other iOS devices. Apps are generally not portable between devices without extensive software development work, so these apps are not easily moved to alternate mobile and tablet platforms such as Android and Windows 8, nor can they work with standard web browsers. Cross-platform application development environments often provide a sub-standard user experience on any single device based on the lowest common denominator between devices.

SUMMARY

An apparatus for synchronized digital sheet music display and audio playback comprises an electronic appliance. The appliance includes (i) an audio output for playing an audio recording of a piece of music, the audio recording including sound-wave sampled audio, and (ii) a display for displaying the piece of music in notation form, the notation form having elements that can be identified, displayed, and highlighted, the elements representing discrete segments of the piece of music, each of the segments having a beginning and an end, the display of the piece of music including a first portion of the piece of music. The apparatus also comprises program software for controllably playing the recording of the piece of music, and for displaying the piece of music. The software comprises program software for highlighting a second portion of the piece of music, the second portion falling within the first portion as a subset thereof, wherein the highlighted second portion advances through the first portion; and display synchronization program software, for synchronizing the highlighted second portion in synchronization with the audio played from the audio output. The program software for controllably playing and displaying supports an electronic book format. Additionally, the apparatus may display and play the content of a book having both written language and music notation content. Audio playback includes both music and a voice reading the written language.

Further features and advantages of embodiments of the subject matter disclosed herein, as well as the structure and operation of preferred embodiments, are described in detail below with reference to the accompanying exemplary drawings.

DESCRIPTION OF DRAWINGS

FIG. 6 is a flow chart showing a method for configuring a general purpose electronic appliance as an embodiment.

DETAILED DESCRIPTION

Figure 1:
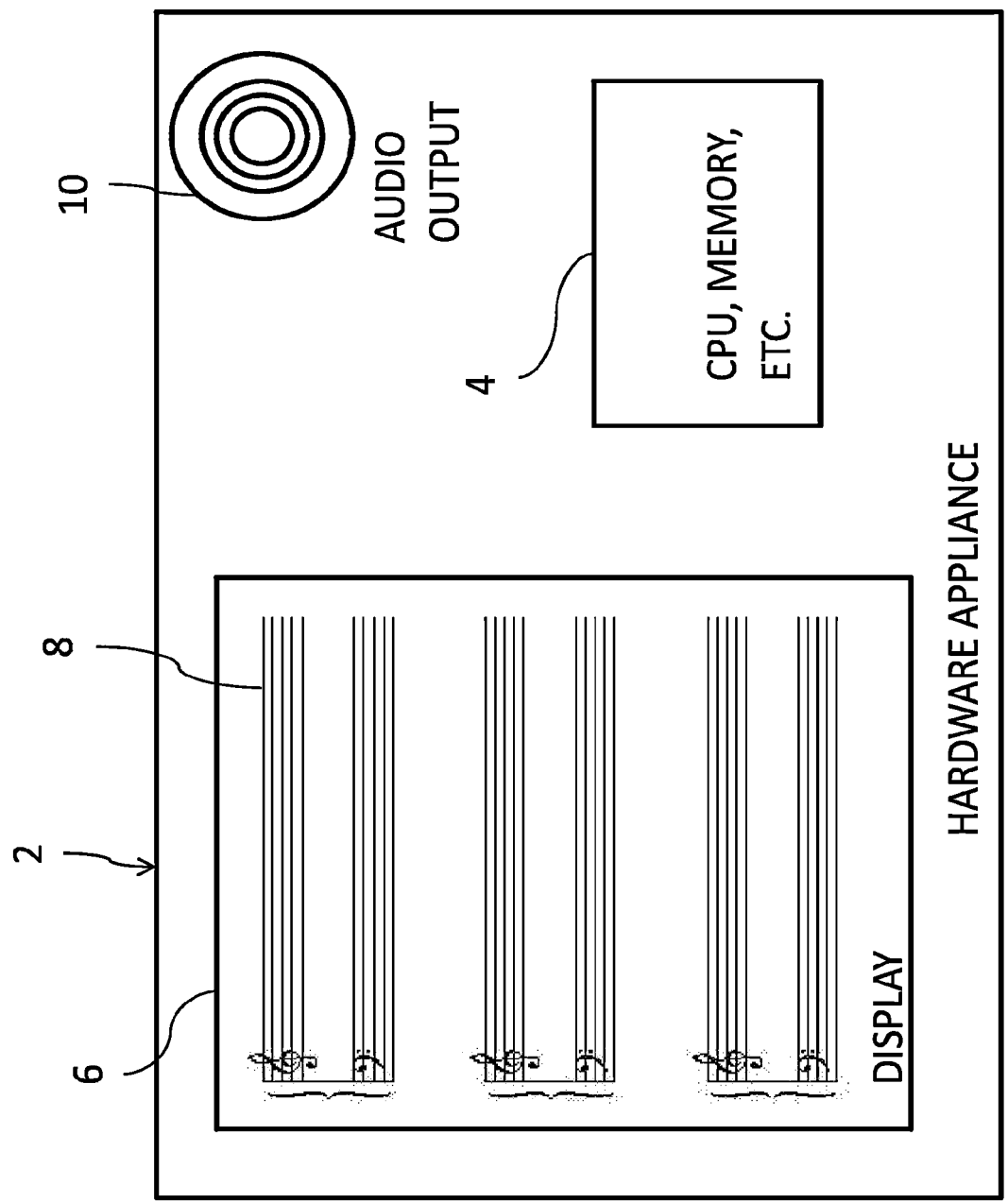
FIG. 1 is a block diagram of an embodiment of an electronic appliance for displaying sheet music and playing music audio.

The subject matter given herein includes references to commercial products offered under product names for which trademark rights may apply. Where applicable, such trademark rights are the property of their owners of record.

The present embodiments relate generally to the use of electronic books as tools to teach, experience, and enjoy music. A process according to an embodiment is operable on portable and non-portable media and computing devices, wherein the electronic book contains visual content of digital sheet music and audio content synchronized to the digital sheet music.

Audio Sheet Music for Music Education and Entertainment

Learning to play a musical instrument is a difficult and time-consuming task; however, there are many commercially-available high-technology tools that claim to make this task easier. Such high-technology solutions include computer-based programs that display real time playing of a musical score, as well as audio-video media files that display how an instrument is played as it is being played. Nevertheless, despite recent advancement, little has been done to adapt existing electronic publication tools to fit the growing portable media device market.

Most of the current generation of digital sheet music apps only work on the iPad and other iOS devices. Apps are generally not portable between devices without extensive software development work, so these apps are not easily moved to alternate mobile and tablet platforms such as Android and Windows 8. Cross-platform application development environments often provide a sub-standard user experience on any single device based on the lowest common denominator between devices. App development history has also seen these frameworks subject to the whims of the device manufacturers, as when Apple banned applications that were written in any languages other than Objective-C or C++, disallowing applications that were written in cross-platform languages such as ActionScript that were cross-compiled into native format.

Digital sheet music apps represent sheet music either in native app formats, or standard cross-application formats like MusicXML and PDF files. Some apps allow conversion of MusicXML files into the native application format. Music that is represented in native formats cannot be shared between applications, meaning that a musician would need to purchase music over again as they change digital sheet music apps. MusicXML files have the potential to be purchased once and used in many different apps. However, MusicXML files currently have no standard mechanism for synchronizing audio files to notation files for synchronized playback. MusicXML files also represent music in a logical format structured around MIDI playback, rather than a visual format structured around display. This makes the format adaptable to a wide variety of apps, but also complicates the process of simply displaying sheet music on a device in a form that captures the fine engraving details of a paper publication.

Most digital sheet music systems go beyond simple reiterations of musical score. Rather than focusing simply on the display of traditional notated sheet music or tablature, they include interactive features such as transpositions, playback at different tempos, substitution of different solo instruments, and muting of particular parts. Typically these choices are made on the computer prior to printing out on paper, or transferring to another device. While these options are helpful for the experienced composer or performer, they complicate the system for people who simply want to listen to a piece of music and simultaneously, automatically follow along in the digital sheet music score.

However, there has not been available a process for developing synchronized digital sheet music that enables a user to listen to a live or master recording of a performance, while simply and easily following along with the music score. There also has not been available a process that enables literate music students to learn music anywhere, while allowing casual music fans how to read music notation so they can understand music more deeply. Further, there has not been available a process that allows this synchronized digital sheet music to be as easy to use as an electronic book, available on the widest range of electronic book readers and media devices. Products offering such capabilities would be useful to today's music students and music fans.

Today's music books shy away from describing how music works, or from showing any music notation examples. Publishers fear they will scare away the average reader with technical jargon or incomprehensible graphics. Electronic books that can read aloud both the text of the book and its musical examples displayed as music notation can bring music fans to a deeper understanding of music without having to already understand music notation.

Common wisdom in the digital sheet music industry today is that electronic books aren't powerful enough to provide a useful digital sheet music format, whether they are industry-standard formats like EPUB or proprietary formats such as iBooks 2. There are many publishers and digital sheet music software companies looking at electronic music textbooks, but they keep following the app-centric path of current generation digital sheet music software. Even the experts in the digital sheet music field do not see the potential of making digital sheet music available directly as electronic books.

A partial exception to this is PerformingEditions.com, which creates EPUBs and other electronic books for music textbooks. However, PerformingEditions.com sticks to independent HTML5 audio controls for musical examples, and focuses on textbooks rather than sheet music. Even this leader in the field has not seen the possibilities of using electronic book formats such as the EPUB format for synchronized audio sheet music.

Block Diagrams of an Electronic Appliance Embodiment

FIG. 1 is an illustrative block diagram of an electronic hardware appliance embodiment. A hardware appliance 2, also called a hardware platform herein, such as an electronic book, computer, etc., includes conventional processing components, shown here collectively as 4, including a central processing unit (CPU), system memory, etc. A display 6 is provided, which may include a video screen, LCD display, etc. In various embodiments such as those to be described elsewhere herein, the display 6 may display digital sheet music. For illustrative purposes, the displayed digital sheet music is here shown as music staves 8. An audio output 10 is provided. While this is shown schematically, it may include separate stereophonic speaker outputs, a jack for coupling to an audio headset or earphones, etc. The appliance 2 also has a suitable user command interface to allow the user to input commands to access data files, select and run software applications, etc. The user command interface could include a physical or logical keyboard or keypad, touch screen, game control or motion control interface, cursor pointing and clicking device, etc.

The digital sheet music information and the audio information will be described in more detail below. That information is stored within the memory of the processing components 4. It may be loaded from a physical medium such as a pre-recorded CD, or by a download from an external source such as a remote storage device, over the Internet, etc.

Figure 2:
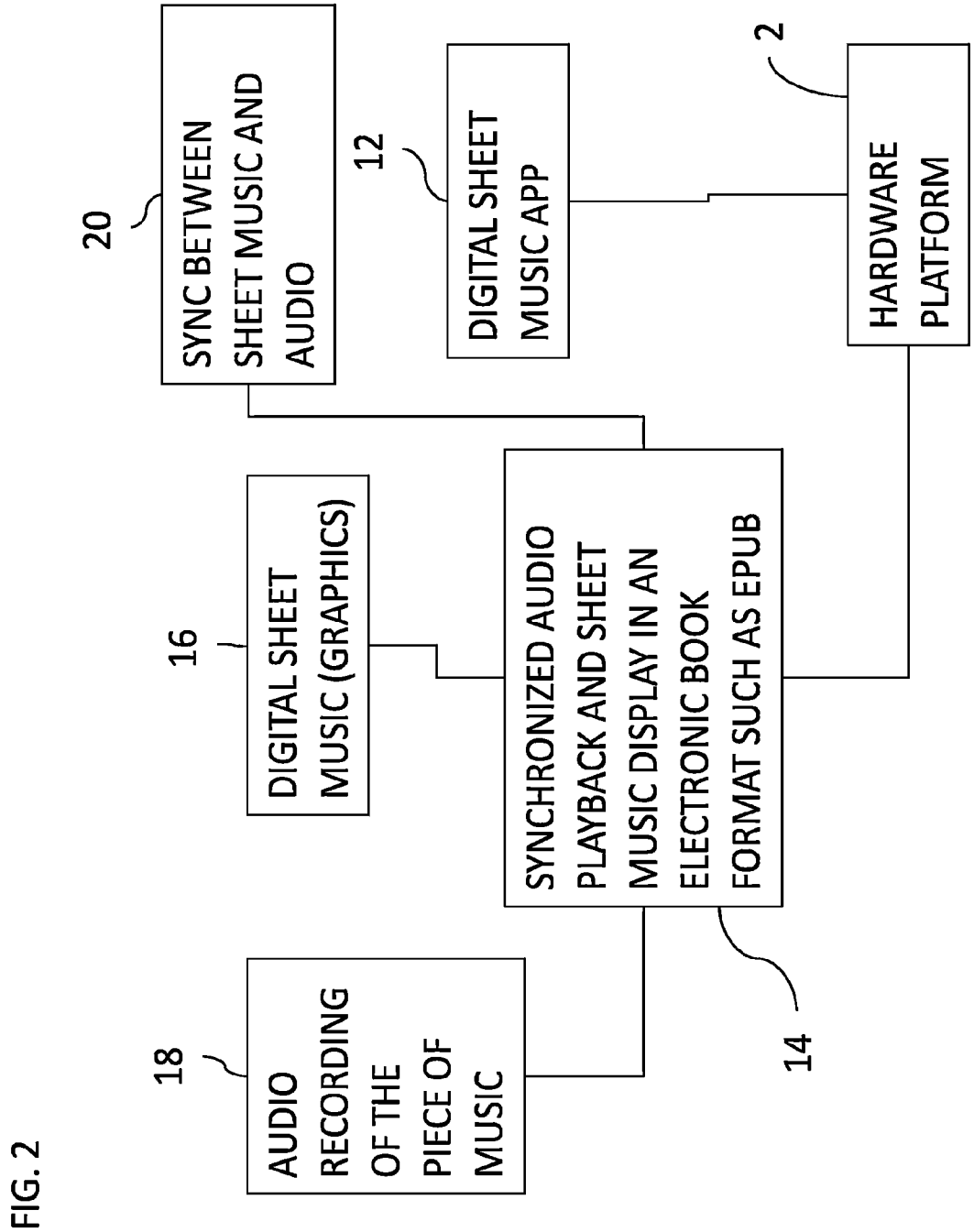
FIGS. 2 and 3 are system block diagrams illustrating additional details of an appliance such as that of FIG. 1.
Figure 3:
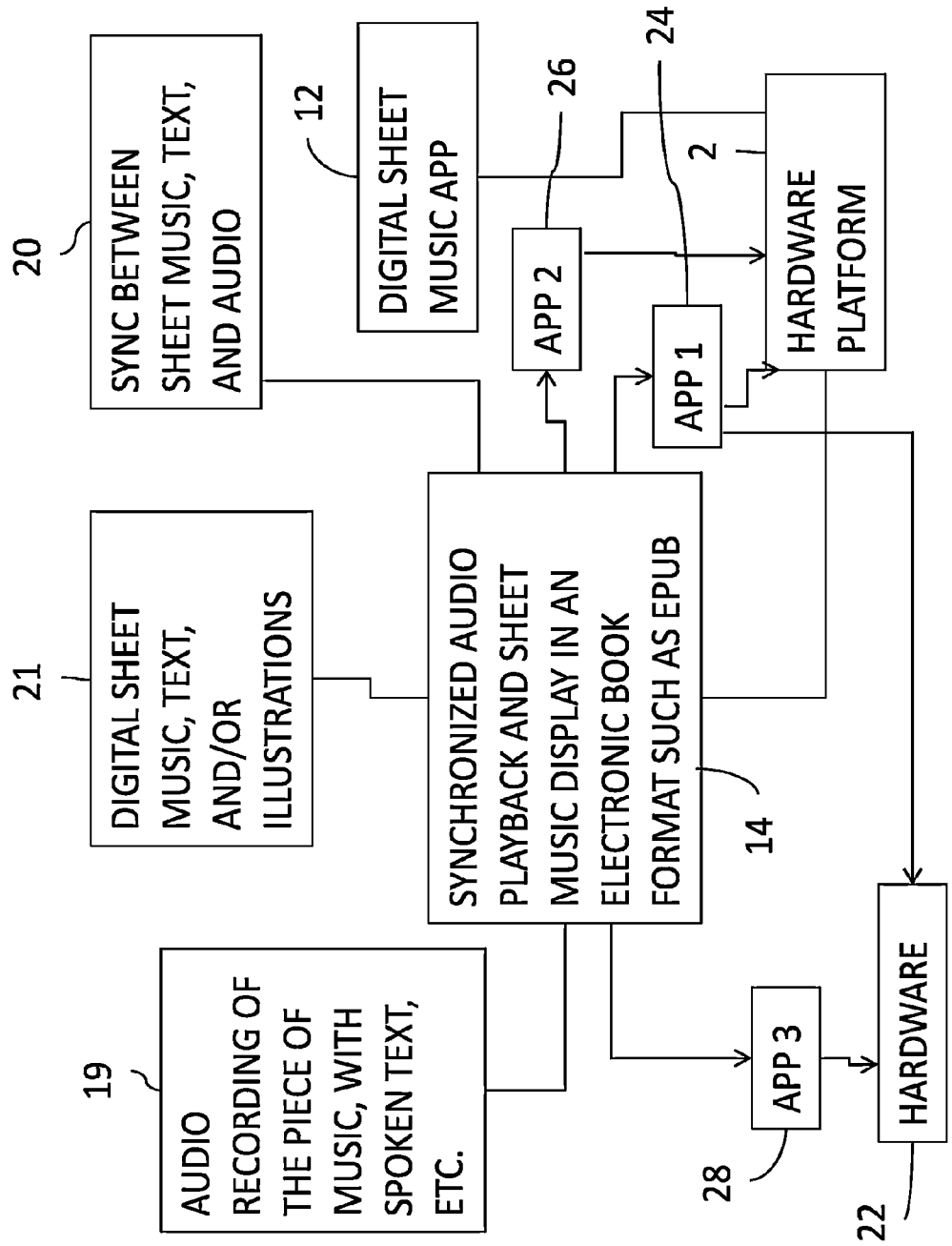

FIGS. 2 and 3 are block diagrams showing an appliance such as that of FIG. 1, along with software applications and data structures for operation of an embodiment.

In FIG. 2, an electronic appliance such as the appliance 2 of FIG. 1 is shown, and is represented as the block labeled Hardware Platform. The hardware platform 2 has, installed and running thereon, an application 12 for supporting digital sheet music. The hardware platform 2 could be an electronic appliance such as an iPad, running a mobile operating system such as iOS ("iPhone Operating System" originally developed by Apple, Inc.). The application 12 could, for instance, be the application Finale SongBook provided by MakeMusic, Inc., or equivalent.

A user-selectable file 14 is provided, which contains information for providing a display of digital sheet music 16 of the user-selected piece of music in an electronic book format such as EPUB, and an audio recording 18 of the piece of music, for providing an audio playback of the piece of music. As will be described in more detail below, the file contains suitable information 20 for facilitating the synchronization, such as hit points within the audio recording 18, which correspond with known points in the digital sheet music 16. Files such as the user-selectable file 14 will be referred to herein as "sheet music files", "piece-of-music files" and other like terms which will be clear from the contexts in which they are used. These terms are intended to be synonyms, without imposing restrictions on their meaning as a consequence of which term is used at any given time. Where a file is intended to be limited either to a symbolic representation of music notation, or to audio (for instance, the audio recording 18 mentioned above), this will also be clear from its context.

FIG. 3 is a block diagram, showing the above-described elements as shown in FIG. 2, but with additional elements to be described.

The audio recording 18 of FIG. 2 is here replaced with an audio recording 19, which may contain a combination of recorded music, spoken text, or other sounds, to provide a wider variety of audio content to play back. This may be useful, for instance, if a text with musical examples is to be displayed. The audio 19 could then narrate text, describe the content of illustrations, and play back an audio recording of musical examples, all in combination to go with corresponding displayed content 21. If the content is of an educational nature, then this additional capability may be employed for the educational purpose.

The synchronization 20 may synchronize at a first level, such as per-page, between the displayed content 21 and the audio 19. Additionally, synchronization at a second level which may represent a finer granularity such as per measure, per note, or per beat, or per word, per phrase, per sentence, or per paragraph, may be provided in a way that will be discussed in more detail below.

Also shown are additional hardware 22 and additional apps 24, 26, and 28, which may represent additional system features. The additional hardware 22 may be an electronic appliance different from the hardware platform 2. For instance, the additional hardware 22 could be a Galaxy Tab 7.7 device available from Samsung, Inc, or an Xbox 360 device available from Microsoft, Inc. Where the hardware platforms 2 and 22 are, for instance, these different products from different manufacturers, the question of cross-platform compatibility becomes significant. Also, different applications for the different platforms may be necessary, even if the different apps have essentially the same features and functionality. In particular, the apps 24, 26, and 28 may be electronic book apps, and may support the EPUB format, which will be discussed below. Cross-compatibility issues are illustrated, if the app 28 is Android-only, the app 26 is iOS only, and the app 24 is cross-platform for both Android and iOS.

Types of Music Representation

There are many different ways of representing music on a computer, tablet, smart phone, or comparable device (hereinafter to be called, without limitation, "computer representations" of music). For better understanding of the discussion which follows, here is a description of, and distinction between, some different types of such music representation.

Music may be thought of as existing in two domains: the domain of sound or audio, and the domain of written notation. Music theory identifies concepts, and provides terminology, which apply in common to both domains, and thus may be thought of as a "Rosetta stone" between the two domains. Computer representations of music may fall into either of these domains, or with alternate representations that capture how music can be performed using electronic instruments.

Computers can represent music in three basic ways:

An audio file represents music as sound. Such audio files are commonly generated by making audio recordings of actual musical performances. This is the type of representation used in iPods, CDs, and other computer applications that play recorded music.

A symbolic representation for musical performance, such as MIDI, represents performance events over time. A performance event may, for instance, be the beginning or the end of the sounding of a musical note. Digital audio workstations such as Cubase and Digital Performer started out as sequencers to edit MIDI data, and evolved to support the editing of audio data as well.

A symbolic representation for musical notation represents music in terms of musical concepts relevant to performers who read music; for instance, musical notes on a staff, sharps and flats, time signatures, clef signs, etc. This is the type of representation used in music notation applications like Finale and Sibelius, or digital sheet music applications like MusicNotes and Legato. In the present disclosure, the terms "sheet music" and "music notation" are, for the most part, used interchangeably. However, the present disclosure describes embodiments in which (i) documents are made up entirely or primarily of music notation, and (ii) documents contain music notation as well as other content, such as written text. The term "sheet music" is used when the content of a document is exclusively or primarily a symbolic representation of music. The synonymous terms "music notation" and "musical notation" also include the case when the symbolic representation of music is part of a larger document that also includes text and/or other non-musical graphics.

Types of Music Representation: Audio

For many audiences, i.e., "consumers" of music, their needs are met with audio representations of music, which they can play on electronic devices which may have computer functionality, or which may merely be audio playback or recording devices. Over the years, this has included tape players, CD players, audio file players such as iPod units, etc.

Older technologies, such as analog tape recordings, were similar in concept to LP records, which represented music in analog form as waves, representative of sound waves, in grooves (actually only one groove spiraling inward) on the record surface. As the record is played, the track is negotiated by a stylus pickup, and magnets convert the mechanical movements of the stylus into analog electronic signals. Similarly, analog tape recordings encoded the same sort of analog sound wave information within a magnetic medium, the coating on the tape.

More recent technologies have employed digital, rather than analog, technologies to capture the audio. Discrete time samples are taken, and represented in numerical form. According to the Nyquist sampling theorem, if n samples per second are taken, then the upper limit of the frequency spectrum of the sound that can be reproduced from the samples is n/2 Hz. Thus, to achieve a frequency spectrum up to 20 kHz (generally considered the upper limit of human hearing), 40,000 samples per second are taken. The sample values, which are represented in terms of binary bits, capture frequency, sound volume, etc. Different digital approaches for such audio capture have included more traditional multi-bit wave samples on CD (16-bit) or DVD (24-bit), or sigma-delta techniques as in SACD.

Since each sample can be 16 bits or more, and taken at frequencies of 44,100 samples per second or more, sample files can take up a lot of space on a computer storage medium. Compression technologies and formats such as MP3, M4A, AAC, and FLAC reduce the amount of storage required for an audio file, making them more useful for portable devices such as iPods. The compression can either be lossless or lossy. Lossy compression can save more space at the expense of sound quality. Perceptual encoding is often used to reduce the loss of sound quality associated with a given amount of file size reduction.

Thus, a digital representation of audio is essentially a digital data file, which can be stored, processed, etc., by computer technology. The growth of this sort of audio representational technology has come hand in hand with the growth of equipment capable of employing such technology. For instance, the phenomenal popularity of iPod devices has brought the use of computers for music applications to more people than ever before.

Types of Music Representation: Symbolic Performance

Standard MIDI Files represent how a performance happens in time, oriented primarily towards keyboard instruments. For instance, a system might include a MIDI keyboard connected to a MIDI synthesizer module. (In MIDI, the note middle C is represented as "note 60".) If a person depresses the middle C key on the keyboard, the keyboard sends a note 60 "note on" MIDI message to the module. In response to the message, the module synthesizes a middle C note 60, and plays the sound of it. When the user lets go of the middle C key, the keyboard sends a note 60 "note off" message, and the module ceases playing the middle C note 60. A MIDI file includes such messages, representing notes the person plays on the keyboard over a period of real time.

It will be seen, then, that there is no unified representation of a note in MIDI, but rather a Note On event at the start and a Note Off event at the end. Rests are not directly represented in MIDI; they can only be inferred by the absence of Note On events. Pitches in MIDI are based on keyboard keys, each of which has a note number. MIDI thus cannot capture distinctions which might be evident from the overall context of the music, such as the distinction between an F-sharp and a G-flat. Such a distinction might be important, for instance, in the context of music written within a given key or tonality. In this example, F-sharp might be the third scale tone in the key of D, while G-flat might be the fourth scale tone in the key of D flat, so whether F-sharp or G-flat is used would depend on which key the music is in.

Types of Music Representation: Symbolic Notation

Musical notation is used, in the generic sense, to refer to any way of conveying musical performance instructions including but not limited to common musical notation with staffs, notes, sharps, flats, and clefs, extending to written instructions in text form to supplement this or supplant or partially replace, as well as alternate forms of expression such as chord charts, words and chords (letters), tablature, jianpu and other number notations, any video, graphic, audio, audiovisual or other display presentation or combination of the aforementioned types of presentations.

Music notation may be thought of as an x-y coordinate system, in which time moves forward from left to right, and pitches are given in terms of their vertical position, high position for high-pitched notes, and low position for low-pitched notes. A staff, consisting of an array of horizontal lines, provides a frame of reference for relative pitches, and for a time sequence. A musical note is positioned on the staff (either on a line or between two adjacent lines) to indicate its pitch. So, for instance, an upward moving scale is notated as a sequence of notes, running from left to right on the staff, each successive note being on the next higher line, or space between lines, than its predecessor.

Timing may be notated on the staff by bar lines, vertical lines that segment the music into manageably small time intervals called measures or bars. A pattern of musical beats, such as ONE-two-three-ONE-two-three . . . , may be represented as a time signature at the beginning of a line, to represent the beat pattern, and bar lines interspersed in the music to indicate boundaries between measures of music, each measure having one ONE-two-three sequence. Pitches may be modified by associating symbols (sharps and flats) with individual notes. Numerous other notational elements, such as dynamic markings, phrasing, tempo changes, etc., may also be used.

Although notation may be thought of as an x-y coordinate system, the physical limits of page or screen size usually require dividing the music up into discrete units called systems which represent a continuous portion of the time of a performance. Systems of notated music may be thought of as equivalent to lines of text on a page. Just as a person would read text from the page one line at a time, left to right and then down to the next line, so music is read, or played, one system at a time. Each system contains one or more staves of music, each of the staves representing the music played by one or more instruments. Systems are ordered sequentially across a succession of pages or screens. Unlike paragraphs of text that may be split across multiple pages, a system does not split across pages. To reduce page turns or display updates, this can involve making formatting decisions such as omitting the staves for instruments that do not play during a particular system. Such a step saves vertical space and allows more systems to be placed on a single page.

Traditionally, composers, arrangers and copyists have written out by hand all of this music symbology onto manuscript paper, printed with only blank staves. Computer systems for music notation have made their jobs much easier, by providing a symbolic representation of common Western music notation. Rather than capturing the performance concepts of MIDI, such as system captures the pitch, rhythm, and other concepts represented on a printed page of sheet music (e.g. MusicXML, Finale, Sibelius). A graphics representation of the appearance of the sheet music may be produced with vector graphics such as SVG format, or with bitmap files such as PNG format. The vector graphics and bitmap approaches can both be used in PDF files, singly or in combination.

These can either be standalone files, or the representations can be combined in a file format that serves as a container for multiple representations. EPUB is a file format that serves as a container for many different representations, using the ZIP container format.

A system of music representation captures all of the above information, and more, and make it visible and legible to the user. This may be done by bit mapping, or by a symbolic system which gives the user more ease and control. A symbolic notation file represents music in terms of musical concepts relevant to performers who read music. This is the type of representation used in music notation applications like Finale and Sibelius, or digital sheet music applications like MusicNotes and Legato.

Text-based representations, especially those based on XML technology, are becoming increasingly popular for file formats. Both the MusicXML notation format and the EPUB electronic book format are based on XML. As with audio files, the size of text files can get to be quite large without compression. It is also common to want to associate graphics, audio, and metadata with the textual data in music and book files. Thus many XML-based formats, including MusicXML and EPUB, use the ZIP format to serve the needs for both compression and for a container of related data. A ZIP file contains one or more files that have been compressed, to reduce file size, using DEFLATE or other compression algorithms, or stored as is. Originally invented by Phil Katz in 1989, support for the ZIP format has been built into both the Windows and Mac OS X operating systems for the past 8 years.

Types of Music Representation: Combination and Interchangeability of Audio, MIDI, and Notation Music notation software has converted notation into MIDI for a long time, since MIDI provides the easiest way to play back music represented in symbolic form. However, MIDI playback depends on the sound-generating equipment available in a device for playing MIDI files. For instance, in one possible embodiment, the audio output 10 of FIG. 1 could include a MIDI sound generator. MIDI sound generators have been hardware-based, but could alternatively be software-based. For instance, iOS added full MIDI capabilities in the iOS 4.2 release, adding the software capability to existing hardware devices.

The built-in MIDI sounds on many of the most popular computers and portable devices are of low quality, giving MIDI a bad reputation in terms of playback quality. Converting symbolic files into audio format is thus a booming business for music notation software developers, especially for classical composers who need to create demos in order to interest performers in their music. Audio files play consistently from device to device. While the sound quality can change from device to device based on the speakers, headphones, and audio stage used, the audio waveforms used by the device to produce the actual sounds do not change as they do with MIDI files.

Symbolic notation files can also be converted into image-based formats like PDF and JPEG. These formats can display the printed music notation, but contain no musical semantics.

Converting audio files to symbolic format, on the other hand, has more in common with some of the most difficult problems in artificial intelligence. No applications solve this problem satisfactorily at this time in any but the most restricted circumstances. Converting MIDI files into notation format is also difficult for similar reasons—there is information present in a notation file that must be inferred from a MIDI file, as it is not represented directly. Notation, MIDI, and audio formats are related, but they are not interchangeable.

Many types of music applications use symbolic notation formats:

Notation editors like Finale and Sibelius are used both to compose music and to prepare music for performance and publication.

Music scanners like SharpEye Music Reader, SmartScore, and PhotoScore convert printed music into symbolic notation format using optical music recognition (OMR), similar to converting printed text into computer text files using optical character recognition (OCR).

Sequencers like Cubase and Logic combine audio and symbolic formats for composers who work more independently of music notation. Though they have limited support for notation, MIDI is the symbolic format of choice for these applications. Sequencers focus on sound output whereas notation editors focus on printed output. Notation-based sequencers like Notion are bridging the gap between these two categories.

Digital music stands like MuseBook Score and OrganMuse display music electronically, listen to the performance, and automatically turn pages as needed.

Digital sheet music applications like MusicNotes and Legato are used to sell sheet music online. They usually offer the ability to play a piece of music and transpose it into a particular key before printing the file.

In the music market, the Macintosh platform is much more important than in many other application areas. This is especially true for high-end professional users. A successful symbolic music format needs to work with both Macintosh and Windows applications.

For many years, the Standard MIDI File (MIDI, 1996) was the only common interchange format for symbolic music files. However, MIDI was developed in order to exchange musical messages between electronic musical instruments, not to exchange music notation between applications. Therefore MIDI contains sophisticated representations for how to make music sound on an instrument, but primitive representations for how to make music appear on a printed page.

Many people tried to develop music formats to move beyond MIDI to a more powerful interchange format for music notation applications. The most noteworthy of the 20th century efforts in this area were NIFF and SMDL. Neither of these formats was widely adopted. Music scanners were the only application category to adopt NIFF as a format for saving files. Despite approval as ISO 10743, SMDL was never implemented by a commercial music application.

The MusicXML notation format has become the first successful standard interchange format that represents the full range of notation for Western music from the mid-$17^{th}$ century onwards (common Western music notation). Since its introduction in 2000 it has been adopted by over 150 applications, including the Finale and Sibelius notation editors, the SharpEye, SmartScore, and PhotoScore music scanners, the Cubase and Notion sequencers, and the MuseBook Score and OrganMuse digital music stands.

In an embodiment, a symbolic music notation representation (optionally with audio as well) is converted into an electronic book representation that combines audio and graphic representations in a single file. If the symbolic representation is notation-based, rather than performance-based like MIDI, then acceptable visual quality is achieved in the graphic representation. If the sound played back in the electronic book is from an audio file, rather than from a MIDI file, then acceptable and consistent sound quality is achieved during playback. The ability of notation representations to convert and correlate both to audio and to graphics representations facilitates the production of audio sheet music in an electronic book format.

Hardware Platforms: Electronic Books, Etc., and their Electronic Book Format, EPUB The appliances described above with reference to FIGS. 1, 2 and 3 may support electronic book functionality, in which a digital sheet music score is provided as the visual content, and a recorded performance of the music is available for playback as read-aloud content. Note that, while a given electronic appliance might be termed an "electronic book", it may be said, more broadly and properly, that a given electronic appliance supports an electronic book format, such as EPUB. One embodiment uses the EPUB 3 format as the electronic book format. Other embodiments include using the hybrid EPUB 2/EPUB 3 format supported by Apple's iBooks software, or future versions of the Amazon Kindle format.

Currently, electronic books are usually associated with portable devices such as cell phone and tablets based on iOS, Android, Windows 8, or similar operating systems. However, electronic books might also be used in the future with large-screen devices. This can already be done today by connecting an iOS device to a large-screen television using Apple's AirPlay technology. Electronic book applications could also run directly on game consoles such as the Microsoft Xbox or Sony PlayStation. Motion sensors such as Microsoft Kinect could be connected to either the game platform or a computer platform. Heads-up displays such as Google glasses could be attached to all levels of devices, from portable phones to room-sized displays. Part of the power of a standard format such as EPUB is its adaptability to a wide range of hardware platforms and different usage scenarios. The present invention envisions electronic books being used everywhere: on phones, portable tablets, larger stand-mounted tablets, laptop and desktop personal computers, wall-sized displays, and room-sized displays.

Nearly all current electronic book readers and tablets, with the exception of the Kindle of Amazon.com, support the standard EPUB format for electronic books. Amazon now provides a conversion tool for converting EPUB files into Kindle Fire format. The Readium project adds support for the EPUB 2 and EPUB 3 formats to web browsers built using WebKit software, such as the Google Chrome browser.

Most of these book readers however only support the EPUB 2 format. Embodiments disclosed herein have the ability to synchronize music and visual display. This was added to the EPUB format in version 3 via the media overlays feature. Apple has added the media overlays feature from EPUB 3 into their EPUB 2-based format used in iBooks versions 1 and 2. Since this is currently the most popular electronic book software that can implement the present invention, both that embodiment and the preferred EPUB 3 embodiment will be described in more detail.

Digital Sheet Music

Sheet music is one area that has seen a great deal of development. As the music publishing industry has adopted new technology, sheet music has evolved into paperless digital formats. Rather than print musical scores and produce books of music, different sheet music providers have developed software that displays musical score data on a computer screen. The explosive growth of the Internet led to the modern era of digital sheet music, beginning with the 1997 Sunhawk Solero and SheetMusicDirect web-based systems. Since then, MusicNotes, Sibelius, MusicRain/Legato, and others have also entered the market, while FreeHand Systems acquired Sunhawk in 2003.

Patent activity in the area of digital music stands and music education supported with digital files long preceded the iPad. Sitrick, U.S. Pat. No. 6,084,168, patented an interactive music workstation that responds to the musician's performance in 2000. Gardner and Conwell, US Patent Application 2001/0037719, applied for a patent on a MIDI-based digital sheet music display system in 2001. Roeder, U.S. Pat. No. 6,660,922, patented a system and method for creating, revising, and provided a music lesson over the network in 2003, relying on MIDI technology. Reynolds and Hudak, U.S. Pat. No. 7,423,214, recognized the importance of synchronization with the recorded performance of an original artist and patented one system and method for synchronized audio and notation in 2008. The invention disclosures in these patents cover many areas of digital sheet music applications. Good's 2007 patent application, US Patent Application 2008/0196575, disclosed a process for creating and viewing digital sheet music on a media device. This was originally conceived for the iPod Classic, and later prototyped for the iPhone and iPad.

With the release of the iPad, many different digital sheet music apps have entered the market. The first of these apps displayed digital sheet music as stored in Portable Document Format (PDF) files. Soon afterwards these programs added the ability to annotate the sheet music with graphical markings, and to play an audio file while watching the sheet music. In these systems, the playback of the audio generally is not synchronized to the digital sheet music displayed. PDF-based apps generally do not provide any highlighting of the music or automatic page turns while the music is being played.

Later generations of iPad apps added more interactivity. The NoteStar app from Yamaha allows musicians to listen to music playing back in synchrony with a scrolling digital sheet music display with automatic system and page updating. HTML5 applications such as the Noteflight Viewer allow digital sheet music to be viewed and played on both desktop and mobile systems without the need to download an app onto a device.

These apps have expanded the boundaries of digital sheet music, but each app is tied to a specific device, a specific format, and/or a specific manufacturer. Even software that uses standard formats such as PDF and HTML5 have ties to the specific software manufacturer. This limits their applicability and usefulness for music publishers and music performers.

Today, most of the world's sheet music is produced by one of two music notation editor applications: the Finale editor manufactured by MakeMusic, and the Sibelius editor manufactured by Avid. Neither of these editors, nor any of the other digital sheet music editors on the market, currently supports creating an EPUB file from a music notation file. There is herein described a manual process to convert a Finale or Sibelius file into an EPUB file with synchronized audio playback. All steps of this process may be automated within a music notation editor.

EPUB uses XHTML files to represent text pages in an electronic book. EPUB also supports Scalable Vector Graphics (SVG) as a format for representing final-form vector graphics and text. In EPUB 3, SVG content may either be embedded in XHTML files, or presented directly as SVG files without an XHTML embedding. The creators of EPUB viewed standalone SVG files as useful for manga or comic books, but it is also useful for digital sheet music. Apple iBooks' EPUB 2 based format does not yet support standalone SVG files, so the manual implementation described here uses XHTML embedding. Presently, this XHTML embedding is the only option for SVG while using EPUB 2.

In an embodiment, digital sheet music technology can also be combined with electronic book technology is yet another way to include music notation examples within the text of a book that discusses musical topics, or otherwise includes musical examples. Publishers have tended to shy away from musical examples in books because the percentage of people who can read musical notation is significantly smaller than the percentage of people who can read text in a given language. Electronic book technology offers several ways to make the ability to read music notation less necessary for potential readers of a book. PerformingEditions.com uses one technique where audio examples can be played within an electronic book by means of user commands to play each musical example, such as touching or clicking a play icon located below the music notation.

In an embodiment, a more integrated and automated system includes playback of music examples seamlessly within the read-aloud playback of a narration of the book's content. The narration may be an audio recording of a voice reading the text, or a computer-generated voice produced by a text-to-speech reading system. The standard read-aloud media overlay feature in EPUB 3 can be used to highlight each word, phrase, sentence, or paragraph as it is read in the narration. This narration can then transition seamlessly to highlighting each note, beat, or measure in a music notation example as each example is encountered, interspersed within the text content. A user then need only set read-aloud playback once, rather than having to press play for each musical example.

Electronic books that are mostly text are designed to change, with the text content flowing or reflowing to adapt to fit the size of the screen and the needs of the reader. Reflowing content adjusts factors such as line widths, line breaks, paragraph breaks, page breaks, graphics positioning, and other formatting details based on factors such as the size and orientation of the display and the size of the fonts used for the text content. The EPUB format is designed in this manner, so that content presentation adapts to the user rather than vice versa.

This principle does not work for all types of documents. In heavily graphical documents such as digital sheet music, content and design are closely intertwined. Automatically updating and reflow of digital sheet music while maintaining high standards of readability and legibility is still an unsolved problem.

Fixed-layout EPUB documents address this problem by allowing content authors to specify exact per-page formatting, rather than having content be able to reflow between pages. The fixed layout applies to both XHTML and SVG content. A digital sheet music EPUB is likely to be a fixed-layout document. A book containing sheet music examples is likely to be reflowing in its XHTML content, while fixed-layout in its SVG musical examples and other vector or bitmap graphics.

The EPUB format allows media overlays to be used with both fixed-layout and reflowing books, though the current version of iBooks can only use media overlays with fixed-layout books. Fixed layout is a common choice for digital sheet music, with the content primarily in SVG format. For books with music examples, electronic books can also reflow text between pages depending on the size of the fonts and the display. When using reflowing EPUBs, text and examples are usually organized into XHTML files by semantic units such as chapters and sections, rather than display units such as pages. In an embodiment, regardless of how the text and examples are divided, a single media overlay file can associate both the text and music audio playback with the text and notation in the corresponding XHTML file with embedded SVG notation.

In an embodiment, electronic books with musical examples might also contain other types of graphics beyond musical notation, such as pictures of the musicians involved in the composition or performance of the piece of music. These graphics are also integrated into the read-aloud playback. The read-aloud system may skip over a graphic that has no audio associated with it, or play an audio clip associated with the individual graphic.

Synchronization

In an embodiment, music audio playback and display of the digital sheet music are synchronized. The concept of synchronization will now be described.

In general, sheet music may be thought of as mapping notated music to a period of real time over which the music is performed (that is, audio is played back). For instance, a piece of music which takes five minutes to perform might be presented in sheet music form as ten pages of notated music. Each page of music is performed over a subset of the overall real time performance period. For instance (assuming for the sake of the example that each of the ten pages requires equal time for its playback), the seventh of the ten pages of sheet music might be played back during the seventh half-minute of the five-minute total performance time.

In an embodiment, then, the pages are successively displayed over the five-minute performance time. The display changes from the sixth page to the seventh page at the point in time (for instance, 3:00 into the playback) at which the playback reaches the beginning of the portion of music that is notated on that page. Likewise, the display moves on from the seventh page to the eighth page at the point in time (for instance, 3:30 into the playback) at which the playback reaches the end of the portion of music notated on the seventh page.

Therefore, a first level of synchronization may be embodied as displaying successive pages of notated digital sheet music, and "turning the page" as the music playback reaches the point at which the music passes from the currently displayed page to the next page.

A second level of synchronization is also operable, within the first level of synchronization, i.e., within a given displayed page of digital sheet music. In an embodiment, user-visible highlighting is used. The highlighting may include a contrasting color such as yellow, or a gray-scale, etc. Also, boldness, opacity, etc., may be changed to provide the user-visible highlighting.

Figure 4:
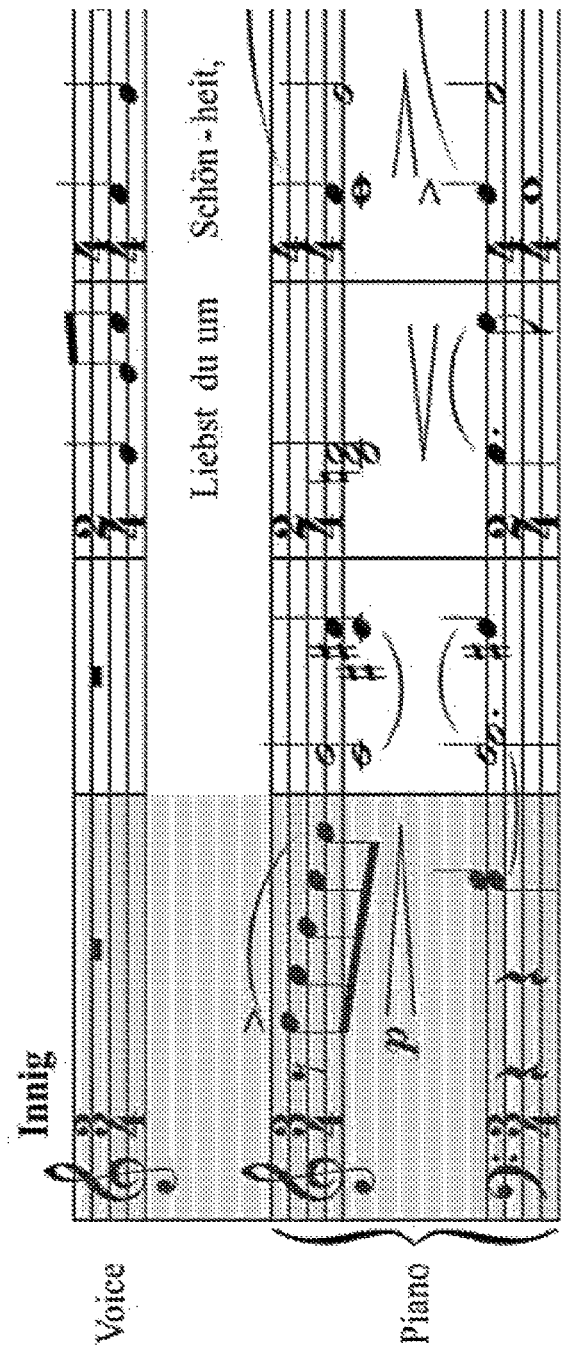
FIG. 4 is an illustration, such as a screen capture, of a user interface display of audio-digital sheet music display synchronization by highlighting a measure of music at a time.

In an embodiment, the highlighting may be on a per-measure basis. For instance, the audio playback proceeds through the music, from measure to successive measure. One measure at a time, the full measure is highlighted in a way that makes it distinctively visible and eye-catching to the user who is viewing the sheet music display while listening to the audio playback. As the audio playback proceeds to the next measure of music, that next measure is likewise highlighted. As the digital sheet music is progressively highlighted, measure by measure, the user may focus his/her attention on the successively highlighted measures, in synchronization with the audio playback, and have an enhanced experience following the sheet music through the playback. When the highlighting reaches the final measure on the displayed page, the display advances to the next page, and the highlighting reappears on the first measure of the next-displayed page, so continuity is maintained for the user. FIG. 4 is an example of a piece of electronically represented sheet music, in which a full measure is highlighted.

In another embodiment, as an alternative to distinctly delimited pages of digital sheet music, the display might scroll over the notated music, from beginning to end, substantially continuously as the audio playback proceeds. To the user, this would appear as a window, capturing a certain portion of the digital sheet music, and progressing, for instance measure by measure, through the entire piece. In such an embodiment, the highlighted portion (for instance, the highlighted measure) might always be present near the middle of the display. As the display scrolls through the music, it will appear to the user as though the music is sliding from right to left, wherein the already-played measures disappear from the left, and newly displayed, to-be-played measures appear on the right.

In another embodiment, the first level of synchronization might be one or more systems of music, rather than a page of music where the number of systems can change from page to page. A standard number of systems at the first level can allow both a more consistent display and more flexibility for interactive features such as transposition and annotations.

Since most music is delimited into measures with easily-visible bar lines between them, in an embodiment the highlighting may be on a per-measure basis. However, this is not necessarily the only way to do the highlighting. For instance, there sometimes will be a considerable number of notes within one measure. In another embodiment, then, the highlighting might be done on a level of granularity different from measure-by-measure. For instance, the highlighting might be on a per-beat basis, such as one of the four beats in a 4/4 (common time) measure, or in a per-note basis.

Figure 5A:
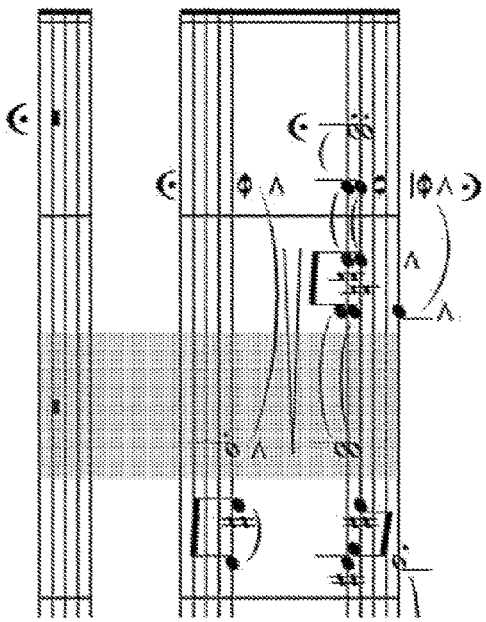
FIGS. 5A, 5B, 5C and 5D are illustrations, such as screen captures, of a user interface display of audio-digital sheet music display synchronization by successively highlighting musical symbols within a single measure.
Figure 5C:
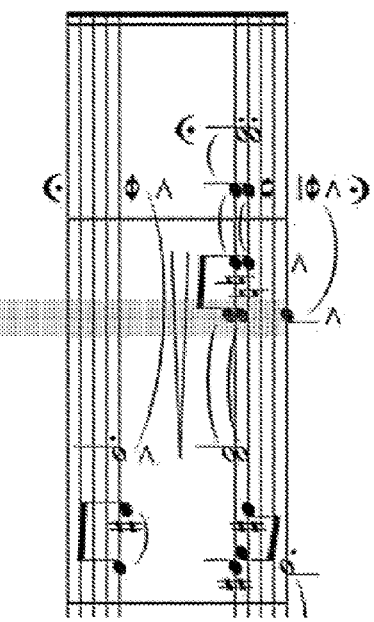
Figure 5B:
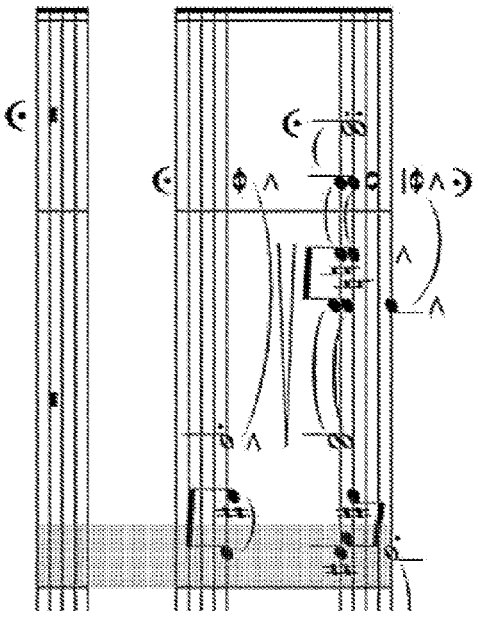
Figure 5D:
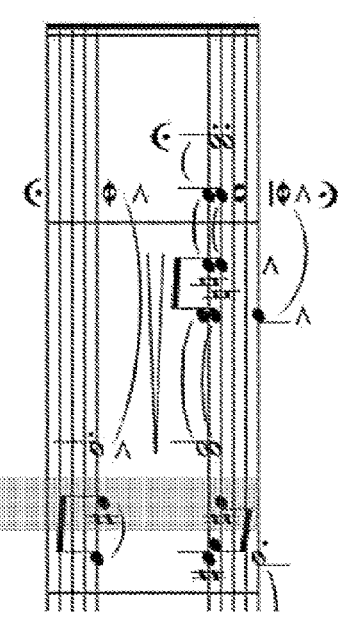

FIGS. 5A, 5B, 5C and 5D illustrate an example of highlighting as described above. Each of these four illustrations shows two identical measures of music, which would be part of a displayed illustration of digital sheet music, such as a page of sheet music. As the audio playback proceeds, this particular page of digital sheet music would eventually be reached. As the audio playback of the music runs, the highlighting progresses through the notated music as described above. These four illustrations show note-level highlighting. The highlighting is here shown as gray-scale shading. It will be observed, in this example of note-level highlighting, that the half note highlighted in FIG. 5C is of greater duration than the notes highlighted in the other three illustrations. Accordingly, the highlighting of FIG. 5C will remain for a correspondingly longer duration.

Also, while the above discussion has described first and second levels of synchronization, additional levels of synchronization may be employed. For instance, in an embodiment, a first level of synchronization might show a page including multiple systems, an intermediate level of synchronization might show one system at a time, for instance by using one style of highlighting of the system, and the above-discussed second level, such as highlighting one measure of music at a time, in a style of highlighting different from that used for the system containing that measure.

Embodiments Related to User Commands; Selection of a Piece of Music; Jumping to a Different Point in the Music During Synchronized Playback As discussed above, in an embodiment, the user may employ the user control interface (such as the user control interface described in connection with FIG. 1) to select a piece of music, for instance from a displayed menu of pieces of music, and start the synchronized playback of the piece. The user may also pause or stop the playback.

Additionally, the user may jump to a different portion of the piece, for instance by touching or clicking on a position in the displayed sheet music representation. Responsive to this user input, the appliance displays the sheet music representation, with highlighting at that point in the music, and plays the audio from that corresponding point. Where the appliance is displaying a first portion of the sheet music representation (for instance, a page) and highlighting a second portion (for instance, a measure of music), the user may select a different second portion by simply clicking or touching on the desired second portion, or otherwise employing an intuitive user interface command.

The user may reach the desired point in the piece of music by moving to a different first portion of the piece of music, and then selecting the desired second portion. To do so, the user selects a different portion, or scrolls through the first portions (pages, systems, etc.), to reach the desired position within the piece. In one possible user interface embodiment, the display may include a sidebar window, showing text, icon or thumbnail representations of the first portions of sheet music, optionally with page-number labels or other indicia, to allow the user to find the desired point in the music. The other indicia may include information that would appear on the page of sheet music, such as rehearsal numbers and letters, tempo markings that denote changes of tempo within the piece, words and phrases of text within songs or other vocal music, etc.

The user commands may be implemented using many different technologies. Touching and clicking are methods for navigating using touch-screen and desktop mouse/trackpad technologies. Alternatively, the user commands may be implemented by using a handheld game controller or wand; by user movements that are recognized and acted on via a motion control interface; by device movements that are recognized by device sensors such as accelerometers and magnetometers; by eye fixations that are recognized and acted on via an eye tracking interface; or by combinations of these technologies and other general-purpose user navigation technologies.

Technical Implementations of Embodiments

In an embodiment, the synchronization of graphics and playback is implemented in EPUB using Media Overlays, a new feature in EPUB 3. EPUB Media Overlays use the Synchronized Multimedia Integration Language (SMIL) to represent audio synchronized with an EPUB Content Document, whether XHTML or SVG. EPUB Media Overlays were designed to support books with synchronized audio narration, including mainstream e-books, educational tools, and e-books formatted for persons with visual disabilities.

The SMIL <par> element (short for "parallel") is the basic building block of a media overlay. The element provides pointers to the two pieces of content being synchronized: 1) the id of the text or other portion of the content document, and 2) the audio clip that should play while the content is highlighted. The <par> element uses two element children to represent this information: a <text> element and an <audio> element. The <par> element renders its children in parallel, so the audio clip and document fragment are played and displayed at the same time, creating a synchronized presentation.

Despite the <text> element name, this element can point to the id of a graphical object, not just the ID of a text object. The SMIL object model and the EPUB Media Overlays document consistently refer to this synchronization in terms of text and narration. There is no evidence that using this language-oriented technology for digital sheet music with synchronized audio was ever contemplated by the technology developers. In the other direction, digital sheet music developers have viewed EPUB and other digital book technology such as Kindle Fire as inadequate for any educational use. This invention of harnessing electronic book technology for audio sheet music is not obvious to those skilled in the art.

In an embodiment, a SMIL file contains "hit points" which are pointers to a particular time in the audio file. As described elsewhere, hit points are employed for synchronization with graphical elements in the representation of music notation. The audio file itself need not have any knowledge of which hit points are employed by the EPUB file. This is a distinction from the SVG graphics data for sheet music. The graphics data does indeed contain identifications of specific highlights of interest to the EPUB file. This division of where data resides is specific to current EPUB embodiments. Other electronic book technologies may alter this; for instance, the audio representation could contain hit points while the graphics does not.

Configuration of a General Purpose Electronic Appliance

FIG. 6 illustrates a process for configuring and using a general purpose electronic appliance, such as an electronic book, etc., to function as an embodiment. The various numbered elements shown in FIG. 6 are given below, by embedding the reference numbers as parentheticals within the descriptive text. A manual process for creating an EPUB version of digital sheet music with synchronized audio playback includes the following steps, with reference to the illustrated elements in FIG. 6:

1. Create a sheet music file (30 in FIG. 6) in a sheet music editor such as Finale or Sibelius.
2. Export (32 in FIG. 6) each page in the sheet music file as a separate vector graphics (SVG) file. Sibelius 7 can export SVG files directly. Finale 2012a and other programs can export PDF files that use vector graphics. Any vector graphics format that can then be imported into a program that exports SVG files can be used here.

3. The SVG content needs to have elements that can be identified by the <par> element in the SMIL file to be displayed and highlighted while an audio clip plays. Current music notation applications do not save vector graphic elements that can be converted into SVG elements for this purpose. In the manual implementation, these highlight elements are drawn manually in a vector graphics program like Adobe Illustrator. In one embodiment, translucent rectangles are drawn in a layer on top of the digital sheet music. These rectangles can be drawn around each measure, or at smaller or larger boundaries. FIG. 4 illustrates the highlighting of measure boundaries. A smaller boundary could either be a beat as specified in the time signature, or the smallest distinct units where a separate note is played. The latter choice roughly corresponds to the "beat chart" in a Finale file, though grace notes would provide an additional level of detail below the elements of a beat chart. FIGS. 5A through 5D show an example of using these smaller note boundaries. A larger boundary would be each system on a page. For automatic following, the smaller units are likely best, but measure units provide greater robustness in the displayed synchronization results from an automated process.

4. A new SVG file with the highlight layer containing translucent rectangles is exported from the graphics program for each page in the sheet music file. In one embodiment, the SVG attribute values for the <rect> elements in the highlight layer are "0.2" for opacity and "#FFFFFF" for fill. This renders the white, mostly transparent layer invisible when the <rect> element is not highlighted. Alternatively, the highlight layer could use a "0.0" value for opacity and a highlight color such as "9AE0F3" for fill. This renders the highlight layer entirely transparent when not highlighted, needing only a change of opacity to create the highlighted display. In one embodiment, the SVG/XHTML overlay rectangles are white and totally transparent (0.0 opacity, #FFFFFF fill). The Cascading Style Sheets (CSS) file then changes both the opacity (for instance, to 0.2) and fill (for instance, to #9AE0F3). Each <rect> element also requires an id attribute with a unique ID. The id need only be unique for a given SVG or XHTML file, not across all SVG or XHTML files in the EPUB document. This id attribute will later be used in the <text> element within the SMIL file. In this embodiment we are describing rectangles and the <rect> element for highlighting. However, other embodiments are possible which use non-rectangular highlights and other SVG elements.

5. If a sheet music file contains repeats that jump back to a previous page, the EPUB document requires separate files for each time a page is played back. The EPUB 3.0 specification does not permit a single SVG or XHTML content document to be associated with more than one media overlay. Each page must be duplicated in a separate content document so that the highlighted playback always progresses forward from one page to another in the electronic book.

6. For audio playback, an audio file needs to be included or created (34 in FIG. 6) for use in the EPUB document. Preferably this is a master recording of a live performance by one or more musicians singing or playing one or more musical instruments. However, a computer-generated audio file may be used as well. The file is in a sampled audio format like M4A, MP3, WAV, or AIFF that represents the sound wave of the actual performance. It is not a MIDI or other symbolic performance file that only captures the notes and rhythms of a performance, without the actual sound waves heard by a listener during performance or playback. In Finale or other notation editors, this could be an audio track that has already been synchronized to the notation in the Finale file, or an audio file created from a machine performance of the sheet music. Alternatively, the audio file of a performance by human musicians could be provided and synchronized separately outside of the notation program. Audio editing programs like Audition and Audacity can be used to capture hit points which mark the beginning and end points for each audio clip associated with each highlight in the SVG data.

7. To specify the synchronization in an electronic book file (36 in FIG. 6), a SMIL file is created for each XHTML or SVG content document in the EPUB file, including any duplicated files created due to repeats. Each highlight rectangle created in step 3 has its own <par> element in the SMIL file. The <text> element has a src attribute that includes the XHTML or SVG file name combined with the id of the SVG <rect> element (e.g., <text src="p1.html#m1">, where "p1.html" is the name of the XHTML file, and "m1" is the id attribute value for the SVG <rect> element. The <audio> element includes a src attribute pointing to the audio file, a clipBegin attribute indicating the start time in the audio file, and a clipEnd attribute indicating the end time in the audio file, e.g. <audio src="music.m4a" clipBegin="0:00:00.000" clipEnd="0:00:03.622"/>. For a digital sheet music application, the clipEnd value for one highlight will usually equal the clipBegin value for the next highlight. The SMIL file need not be restricted to the elements described here. All SMIL features supported by the EPUB format may be used, such as the <seq> element that is used for structuring a sequence of media objects.

8. In order to highlight the music element as the audio is being played, an EPUB Style Sheet document is created. The CSS file contains an author-defined class name together with the CSS styling to be applied when the document element becomes active during playback. In our first example where the fill attribute for each highlight element was a pure white "#FFFFFF", we could use a fill value of "#9AE0F3" to indicate a light blue. The opacity value of "0.2" would still be applied so that the transparent highlighting does not obscure the music. In our second example where the opacity value was "0.0", the CSS styling could change the opacity to "0.2", leaving the fill at its original highlighted value of "#9AE0F3". This removes the slight dimming of the music caused by the translucent white overlay when not highlighted. In another embodiment, the CSS styling changes both the opacity and the fill values. Other highlighting styles can be chosen, for aesthetic preferences and other reasons. A typical CSS class name for this feature is "-epub-media-overlay-active". In the EPUB 3 specification, this class name then needs to be declared using the metadata property active-class in the EPUB package document so that readers can discover it. In the EPUB 2-based iBooks format, the iBooks reader predefines the "-epub-media-overlay-active" property.

9. EPUB 3 documents require an EPUB Navigation Document for publication-wide navigation information such as a table of contents. The older EPUB 2-based system used by iBooks requires the predecessor of the EPUB Navigation Document, a Navigation Center eXtended (NCX) file. For short digital sheet music files representing a single piece, the navigation document or NCX might simply contain a reference to the first page of the sheet music. A collection of pieces might contains reference to the first page of each piece. EPUB 3 readers can support the older EPUB 2 format that uses the NCX file.

10. Every EPUB file must contain exactly one package document. This document contains structural and bibliographic metadata about an EPUB publication. It is the primary source of information about how to process and display an EPUB. Each package document contains a <metadata> element with Dublin Core metadata, a <manifest> element that lists the publication resources within the EPUB file, including the XHTML and SVG content documents, audio file, and media overlays, and a <spine> element that provides the default reading or playback order for the EPUB publication. Other elements are optional. The package document, typically using an .opf suffix, is created at this stage since it must reference each of the documents created in earlier steps.

11. We now create the files needed by the EPUB Open Container Format. These include two files: a META-INF/container.xml file that points to the package file created in step 10, and a mimetype file containing the string "application/epub+zip". When using an EPUB Zip Container, this mimetype file must be the first entry in the zip file, placed in the root directory.

12. We now create any META-INF files needed by a specific reading system. For the iBooks system, we need to specify that we are using a fixed layout book. To do this, we create a com.apple.books.display-options.xml file that sets the "fixed-layout" option to true: <option name="fixed-layout">true</option>.

13. Finally, we assemble all these components into a zip file, with the mimetype file as the first entry. The end result is the electronic book file (36). In an automated process, where the electronic book is created directly from the sheet music editor program, the program may either write separate files as described here, or may generate the different types of content (vector graphics representations, audio recording, synchronization data, metadata, etc.) directly as entries within the zip file, with no intermediate files required.

Once the electronic book is created, it gets distributed to the user to install on their general-purpose electronic appliance (38 in FIG. 6). For electronic books created and distributed by music publishers, the installation can happen using an electronic bookstore such as iBooks on the iPad. For self-published electronic books, installation can happen manually using synchronization programs such as iTunes or Dropbox. The installation makes the electronic book file available to the software on the electronic appliance that can open an electronic book.

Once installed, the user can then open the electronic book on their electronic appliance, listen to the playback of the audio file, and observe the displayed sheet music with highlighting that synchronizes to the audio playback (40 in FIG. 6).

This process works somewhat differently for embodiments, when creating an EPUB for a book with music notation examples together. For example, in step 1 given above (shown as 30 in FIG. 6), the book's text and graphics content needs to be created as well as the sheet music file. This could be done in a word processor such as Microsoft Word or publication software such as Adobe InDesign. The sheet music file created in step 1 may combine several musical examples onto a single page, separate each example onto its own page, or separate each example into its own file. With any of these approaches, each musical example would be exported as an SVG file in step 2 given above (shown as 32 in FIG. 6), rather than each page. An additional step following step 2 could combine the music notation vector graphics and the text in a publication program such as Adobe InDesign. In step 3 given above, the text markup need not have any bounding boxes or other additional graphics. The XHTML text itself can be marked up with identifiers for highlighting by adding identifiers to elements such as <p> and <span>.

When preparing audio playback in step 6 given above (shown as 34 in FIG. 6), the audio for the text in a book may come either from a voice recording of a narrator reading the text, or from a computer-generated voice created by a text-to-speech system. In the present patent application and claims, language such as "a voice reading the written language text", or the like, will be understood to mean, without limitation, any of the above ways of providing voice for audio playback, and others within the spirit and scope of the present disclosure, which would be understood by those skilled in the art. If the text-to-speech system is being used, then the corresponding <par> elements in the SMIL files created in step 7 given above will contain a <text> element, but no <audio> element. In step 7, while books can use fixed layout and export one EPUB content document per page, content documents could also be created per chapter or section in a flowing layout. In this case, the fixed-layout option would not be set in step 12 given above. Audio playback would then not be supported on the current version of the iBooks software, but could be used in other EPUB readers that support media overlays with reflowable books. Reflowable layout would be possible for audio sheet music as well as for books with music notation examples, but this is currently beyond the technical capabilities of today's EPUB reader software.

Operation of an Embodiment

Figure 7:
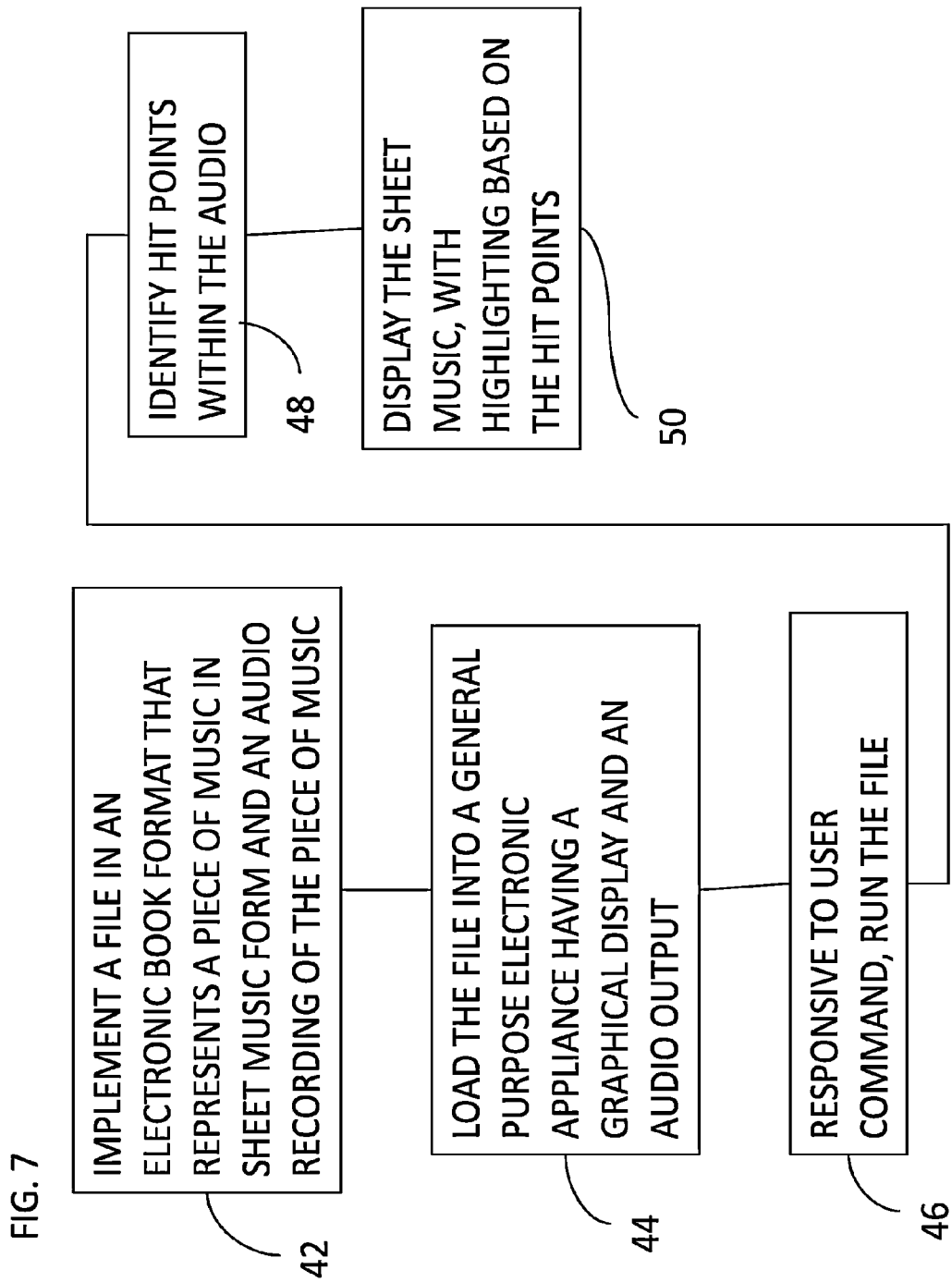
FIG. 7 is a flow chart showing a method for operating an electronic appliance according to an embodiment.

An electronic appliance, such as a general purpose computer-based appliance such an electronic book, etc., and which embodies the disclosed subject matter, may operate as shown in the flowchart of FIG. 7.

Initially, an electronic book file is implemented (42 in FIG. 7) which represents a piece of music of interest. The file incorporates an audio recording of the piece of music, such as a sound recording of a live performance, and digital sheet music data, in a format such as a vector graphics representation. The file implementation 42 can be done either by the user, to create the user's own EPUB, or by the publisher or distributor. In the latter case, the rest of the activities illustrated in FIG. 7 are done by a different party from the party that does the file implementation 42. The file is loaded (44 in FIG. 7), by suitable means such as a download or installation from a computer-readable medium such as a CD-ROM, into the electronic appliance.

The electronic appliance may then be operated by a user, using suitable user command inputs such as a graphical user interface described below. The user selects the file, from among other similar files, representing the piece of music of interest to the user. The user then enters a command to run the file (46 in FIG. 7). Doing so causes the audio file of the piece of music to begin playing back, and further causes the digital sheet music to be displayed. In the current version of iBooks, this is done with the "Read Aloud" feature.

As the audio proceeds to play back, hit points are encountered and identified (48 in FIG. 7). The hit points may be within the audio recording, or may be stored elsewhere for flagging as the audio plays. The hit points correspond with various positions within the digital sheet music data. Based on those positions, portions of the digital sheet music that is displayed are highlighted (50 in FIG. 7). The highlighting thus brings the user's attention to the portion of the displayed digital sheet music which corresponds with the audio being played back at that moment in time. For instance, measures of music may be highlighted one at a time, or individual notes may be displayed for durations in time related to their rhythmic note values, or beats of music may be highlighted, which may in some cases highlight only one note of a one-beat value, or multiple notes of shorter values.

An Embodiment of a User Control Interface

A graphical user interface for user control and operation of an appliance according to an embodiment may be provided through the same display as that used for the digital sheet music display. The display may, for instance, provide a menu of applications and music files in list or icon format. Also, a user interface may illustrate various music files, from which the user may select, in a suggestive or metaphorical style, such as an image of a bookshelf with various icons, appearing as books, available for selection. These sort of graphical representations likely will be familiar to users who have experience with Windows-type user interfaces, and with electronic book user interfaces.

When a user activates an app for sheet music display synchronized with audio playback, as per an embodiment described herein, the initial portion of the digital sheet music, such as a first page, is displayed. In one embodiment, the display can include a page count, for instance in a form such as "page 1 of 2", expressed either in alphanumeric characters, or in an iconic image of multiple pages (for instance, two pages shown side by side), in which one of the pages is highlighted to indicate which page is being fully displayed.

Figure 8:
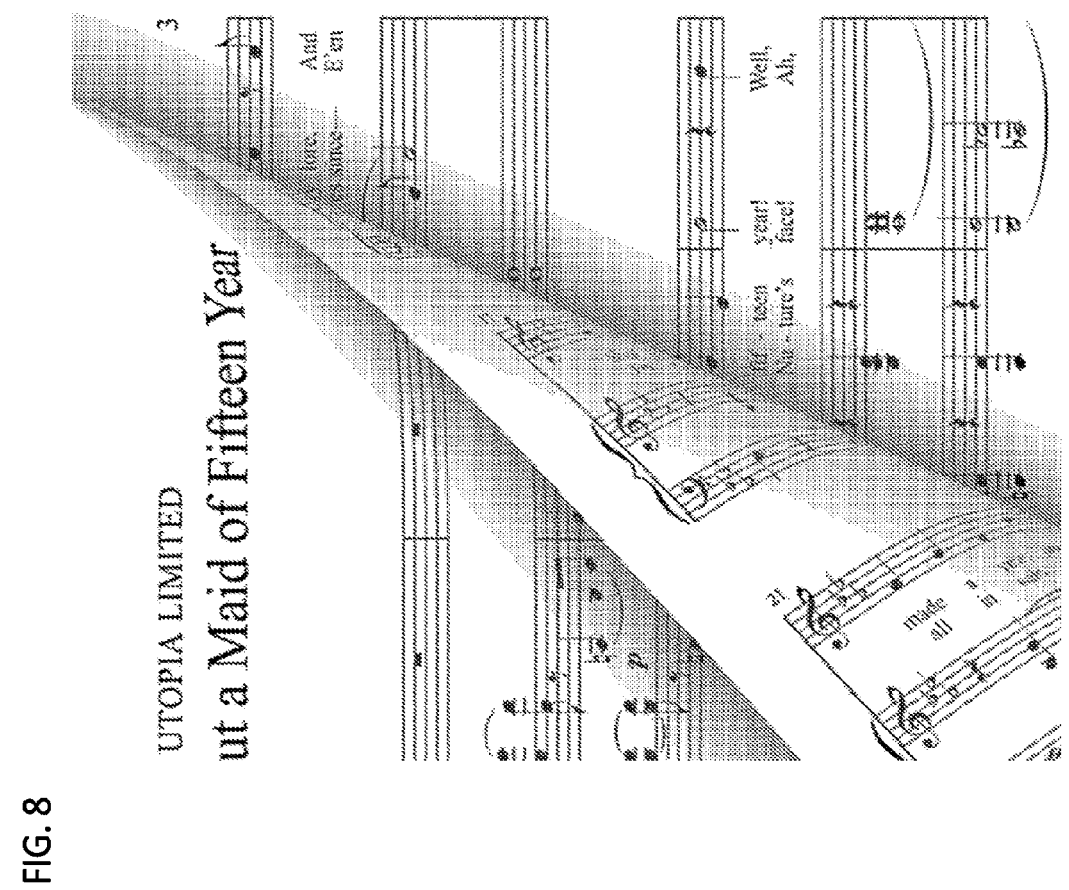
FIG. 8 is an illustration, such as a screen capture, of a user interface display of a turning page of a digital sheet music display.

The user may activate the synchronized playback, for instance by clicking on a taskbar icon. Responsive to this, the display may show a user control, which may include a clickable "go" or "start" command which toggles to a "pause" and/or a "halt" command while playback is running, and then toggle back to a "resume" command when the playback is paused. A selectable control may be provided, either to allow automatic page turning during playback, or to allow the user to turn pages manually. For the latter situation, the user may page forward to a desired location, such as a desired page. Then, when playback is selected, the playback and synchronized highlighting commence at the beginning of that page. In one embodiment, a page turn might be illustrated graphically, for instance as shown in FIG. 8. Alternatively, the page turn might be implemented as a short animation showing a page turn, in which the animation is given as a sequence of cel-type images. For instance, an intermediate cel image within the animation sequence, in which the page is shown as partially turned, might be as shown in FIG. 8.

The selection of pages represents a first level of display and playback control that the user can manipulate. The user can also have playback starting at any of the available second levels of highlighting, whether those are at measure, beat, or note level. One way to choose the new starting point for playback on a mobile device is to simply touch the area of the display that shows the desired measure, beat, or note. Playback will then commence at this second level of segmentation. This manual playback control may be combined with automatic page turning, so both automatic and manual playback control can be intermixed by the user.

There are a wide variety of ways that the user can move to either a page or a measure, beat, or note within a page beyond the interaction techniques described here for mobile device. On a desktop appliance, navigation could be done via a mouse or trackpad. In a game appliance, navigation could be done via a game controller, or gesture detection via a motion-control device like the Kinect. In any of these systems, eye tracking could provide another way to navigate, though the system would need to carefully judge fixations intended to move to a new portion of the music vs. the normal lookahead that musicians use when reading music to anticipate what is coming next.

A volume control, such as a user-manipulable volume slide bar and a mute button, may be provided.

A display option menu may also be provided, to allow the user on-the-fly control over the type of highlighting used, while the playback proceeds.

Standardization, Interchangeability

A music notation program can automatically generate all the information created in this manual process. The EPUB 3.0 and iBooks formats contain many other options that can be used to create different types of digital sheet music and other electronic books. The technique used for synchronizing audio with sheet music can be integrated together with the normal usage of synchronizing narration with text for use in an audio book that contains music notation examples. The ability of a notation program such as Finale to generate highlighting, IDs, and SMIL files for notation examples could be combined with similar tooling for normal text-based books from applications such as Adobe InDesign to address the market for more general books that also contain musical examples.

There has been research and development done in automatic synchronization of sheet music to audio recordings, much of which is referenced in Good's 2007 patent application. Meinard Müller, Frank Kurth, and Christian Fremerey have collaborated with other colleagues on some of the leading work in this area. In this invention we are creating EPUBs from audio and sheet music that has already been synchronized, whether that synchronization is done manually, automatically, or automatically with manual edits.

The EPUB 3.0 and iBooks formats both contain sufficient documentation to describe how audio sheet music books can be implemented, and we have used them for reference here. Other electronic book formats such as the Kindle may also contain, document, or add similar media overlay capabilities. This invention is not restricted to EPUB 3 and iBooks, but applies to any electronic book format that allows for audio synchronization with text and graphics.

Computer Program Product Embodiments

Embodiments may be provided as computer program products, i.e., computer-readable media bearing software program code for directing a computer, electronic book, or other type of electronic appliance to provide digital sheet music display and audio playback, synchronized with each other, as generally described herein. Such computer-readable media might include an article of manufacture such as a pre-recorded CD, or might include download over the internet or other suitable communication media. Such computer program products might be commercialized and sold to buyers who own or possess general purpose electronic appliances, such that the software program code shall be installed on the general purpose electronic appliances to run thereon, and provide the user with functionality such as that described herein.

The software program code provided may include instructions for directing a computer apparatus, stand-alone appliance such as an electronic book, or the like, to perform functions as described herein. The functions might include various aspects of configuring a general purpose electronic appliance to serve as a music teaching apparatus, or might include various aspects of operating an electronic appliance to play music and display sheet music with synchronization.

Other functions within the spirit and scope of the subject matter set forth herein, as well, may be implemented Applicants recognize that the law of patenting software-related inventions is evolving, and that once-patentable articles of manufacture are not necessarily examined for patentability the same way, as of this filing, as they were a few years ago. Depending on the state of the law as it continues to evolve, the computer program product embodiments herein disclosed might be claimed as patentable subject matter under law consistent with In re Beauregard, 53 F.3d 1583 (Fed. Cir. 1995), or might otherwise merely be provided as part of the disclosure of the present subject matter, as per the definitions here set forth. While, within each of the distinct sets of computer program product embodiments, the various successive embodiments are numbered consecutively with cross-references to each other, and while each set begins such consecutive numbering from the number (1), it will be understood that the sets are distinct from each other, and that any cross-referencing by number is understood to be within the set of embodiments in question.

First Set of Computer Program Product Embodiments:

(1). A computer program product for directing a computer to provide audio sheet music as an electronic book for use with an electronic appliance, the computer program product comprising:

a computer-readable medium, and software program code on the computer-readable medium, for directing the computer to:

implement a piece-of-music file, in an electronic book format, representing (i) a piece of music, the file including the piece of music in a form of music notation content, the music notation content having elements that can be identified, displayed, and highlighted, the elements representing discrete segments of the piece of music, each of the segments having a beginning and an end; and (ii) an audio recording of the piece of music, the audio recording including sound-wave sampled audio; and (iii) synchronization data marking beginning and end points in the audio recording for each element of the piece of music; and provide the piece-of-music file to a user, whereby the user may load the piece-of-music file into a general purpose electronic appliance supporting the electronic book format, having a graphical display and an audio output; and whereby the electronic appliance may be user-operated to play music and display sheet music with synchronization.

(2). A computer program product as set forth in (1) above, wherein the electronic book format of the implemented file is EPUB.

(3). A computer program product as set forth in (1) above, wherein the music notation content includes a vector graphics representation.

(4). A computer program product as set forth in (1) above, wherein the software program code for directing the computer to implement includes software program code for directing the computer to:

create a sheet music file for a piece of music, in a sheet music editor;

export the sheet music file as vector graphics content having elements that can be identified, displayed, and highlighted, the elements representing discrete segments of the piece of music, each of the segments having a beginning and an end;

obtain an audio recording of the piece of music, the audio recording including sound-wave sampled audio;

synchronize the audio recording with the vector graphics content, such that beginning and end points within the audio recording correspond with the elements of the piece of music that represent the discrete segments thereof; and generate an electronic book file, incorporating the audio recording and the vector graphics content of the sheet music.

(5). A computer program product as set forth in (4) above, wherein, in the exporting the sheet music file, the vector graphics content has elements identified by a <par> element in SMIL synchronization data, to be displayed and highlighted while the audio file is played back.

(6). A computer program product as set forth in (4) above, wherein, in the exporting the sheet music file, the vector graphics content has a highlight layer containing translucent rectangles, and the exporting the sheet music file includes exporting the vector graphics content for each page in the sheet music file.

(7). A computer program product as set forth in (4) above, wherein, if the sheet music file contains a repeat of a section of the music that goes back, from within a current first portion to a previously played first portion, separate vector graphics content is provided for each time the section of the music is played back, whereby the highlighted playback always progresses toward the end.

(8). A computer program product as set forth in (4) above, wherein, the obtaining an audio recording includes obtaining sampled audio that represents the sound wave of an actual performance of the music by one or more musicians singing and/or playing one or more musical instruments.

(9). A computer program product as set forth in (1) above, wherein the software program code for directing the computer to implement includes software program code for directing the computer to:

create a sheet music file for a piece of music, in a sheet music editor, that generates vector graphics representations, from the sheet music file, having elements that can be identified, displayed, and highlighted, the elements representing discrete segments of the piece of music, each of the segments having a beginning and an end;

obtain an audio recording of the piece of music, the audio recording including sound-wave sampled audio;

generate synchronization data to synchronize the audio recording to the vector graphics representations, wherein beginning and end points in the audio recording correspond with the elements of the piece of music that represent the discrete segments thereof; and generate an electronic book file, that includes the vector graphics representations for each segment of sheet music; the audio recording; and the synchronization data between the vector graphics and the audio recording.

(10). A computer program product as set forth in (9) above, wherein each vector graphics representation has elements identified by a <par> element in SMIL synchronization data, to be displayed and highlighted while the audio file is played back.

(11). A computer program product as set forth in (9) above, wherein each vector graphics representation has a highlight layer containing translucent rectangles.

(12). A computer program product as set forth in (9) above, wherein, if the sheet music file contains a repeat of a section of the music that goes back, from within a current first portion to a previously played first portion, separate vector graphics representations are provided for each time the section of the music is played back, whereby the highlighted playback always progresses toward the end.

(13). A computer program product as set forth in (9) above, wherein, the obtaining an audio recording includes obtaining sampled audio that represents the sound wave of an actual performance of the music.

Second Set of Computer Program Product Embodiments:

(1). A computer program product, for use with an electronic appliance which supports an electronic book format, for displaying audio sheet music on the electronic appliance, the electronic appliance having a user command interface, a graphical display and an audio output, and having therein a piece-of-music file, in electronic book format, representing a piece of music to be played and displayed as the audio sheet music, the piece-of-music file comprising a representation of sheet music and a music audio recording; the audio recording including sound-wave sampled audio;

the computer program product comprising:

a computer-readable medium, and software program code on the computer-readable medium, for directing the electronic appliance to:

execute program software for controllably playing the recording of the piece of music, and for displaying the piece of music, the program software supporting an electronic book format;

responsive to user command, play the music audio recording through the audio output;

display the sheet music:
  (i) by displaying a first portion of the sheet music, the first portion containing a sequence of second portions of the sheet music, and
  (ii) by highlighting the second portions of the sheet music, in sequence, such that the highlighted second portions advance through the first portion; and synchronize the successively highlighted second portions with the music audio recording as it is played from the audio output.

(2). A computer program product as set forth in (1) above, wherein the electronic book format of the piece-of-music file is EPUB.

(3). A computer program product as set forth in (1) above, wherein the sheet music representation includes a vector graphics representation.

(4). A computer program product as set forth in (1) above, wherein the software program code for directing the electronic appliance to display by highlighting second portions includes software program code for directing the electronic appliance to put a fill in the second portion, and to advance the fill as the successive second portions advance through the first portion.

(5). A computer program product as set forth in (4) above, wherein the software program code for directing the electronic appliance to put the fill in the second portion includes:

software program code for directing the electronic appliance to change the opacity of a pre-existing fill from fully transparent to translucent.

(6). A computer program product as set forth in (1) above, wherein the first portion of the piece of music is a page of sheet music.

(7). A computer program product as set forth in (1) above, wherein the first portion of the piece of music is a system of sheet music.

(8). A computer program product as set forth in (1) above, wherein the second portion of the piece of music is one of:

a measure of music within the first portion of the piece of music;

a beat of music, as defined by a time signature of the piece of music; and a note of music, a duration of the second portion being determined by a rhythmic value of the note of music.

(9). A computer program product as set forth in (1) above, wherein the software program code for directing the electronic appliance to synchronize includes causing the display to highlight the second portion of the piece of music in synchronization with the audio played from the audio output, the synchronizing being based on data that synchronizes starting and ending points within the audio recording with the notation elements representing the beginnings and ends of each segment.

(10). A computer program product as set forth in (9) above, wherein the data that synchronizes the audio recording and the notation elements is in the SMIL format.

(11). A computer program product as set forth in (1) above, wherein the user command interface allows the user to manually jump to any first portion of music, with synchronized playback restarting at the start of the newly selected portion of music.

(12). A computer program product as set forth in (1) above, wherein the user command interface allows the user to manually jump to any second portion of music within the currently displayed first portion of music, with synchronized playback restarting at the start of the newly selected second portion of music.

(13). A computer program product as set forth in (1) above, wherein the user command interface is a touch screen interface.

(14). A computer program product as set forth in (1) above, wherein the user command interface is a game control interface.

(15). A computer program product as set forth in (1) above, wherein the user command interface is a motion control interface.

Third Set of Computer Program Product Embodiments:

(1). A computer program product for directing a computer to provide content including written language text and representations of pieces of music in notation form with audio synchronization as an electronic book, the computer program product comprising:

a computer-readable medium, and software program code on the computer-readable medium, for directing the computer to:

implement an electronic book file in an electronic book format, representing:
  (i) an audio recording of a voice reading the written language text, and audio recordings of the pieces of music, the audio recordings including sound-wave sampled audio;
  (ii) the written language text and music notation content, having elements that can be identified, displayed, and highlighted, the elements representing discrete segments of the written language and music notation content, each of the segments having a beginning and an end, the display of the book including a first portion of the book content; and
  (iii) synchronization data marking beginning and end points in the audio recordings for each element of the written language text and the pieces of music; and provide the electronic book file to a user, whereby a user may load the content into a general purpose electronic appliance supporting the electronic book format, having a graphical display and an audio output; and whereby the electronic appliance may be user-operated to play and display the content with synchronization.

(2). A computer program product as set forth in (1) above, wherein the electronic book format of the implemented file is EPUB.

(3). A computer program product as set forth in (1) above, wherein the music notation content includes a vector graphics representation.

(4). A computer program product as set forth in (1) above, wherein the software program code for directing the computer to implement the electronic book representing the written language text and music notation content includes software program code for directing the computer to:
create sheet music files for the pieces of music, in a sheet music editor; and
export the sheet music files as vector graphics representations having elements that can be identified, displayed, and highlighted, the elements representing discrete segments of the pieces of music, each of the segments having a beginning and an end; and
combine the vector graphics representations of the music notation content with text representations of the written language content; and
wherein the implementing the electronic book representing the synchronization data includes generating synchronization data to synchronize the audio recordings to the book's written language text and music notation content, wherein the beginning and end points in the audio recordings correspond with the elements of the content that represent the discrete segments thereof; and
wherein the computer program product further comprises generating an electronic book file, incorporating the audio recordings, the written language text, and the vector graphics representations.
(5). A computer program product as set forth in (4) above, wherein, in the exporting the sheet music files, the vector graphics representations have elements identified by a <par> element in SMIL synchronization data, to be displayed and highlighted while the audio clips are played back.
(6). A computer program product as set forth in (4) above, wherein, in the exporting the sheet music files, the vector graphics representations have highlight layers containing translucent rectangles, and the exporting the sheet music files includes exporting the vector graphics content for each discrete segment in the sheet music file.
(7). A computer program product as set forth in (4) above, wherein the audio recordings of the pieces of music include sampled audio that represents the sound waves of actual performances of the pieces of music.

Fourth Set of Computer Program Product Embodiments:
(1). A computer program product, for use with an electronic appliance which supports an electronic book format, for displaying and playing books with written language and representations of pieces of music in notation form on the electronic appliance,
the electronic appliance having a user command interface, a graphical display and an audio output, and having therein written language and music notation content, in electronic book format, representing written text interspersed with pieces of music to be played and displayed as audio sheet music, and audio recordings of a voice reading the written language text, and audio recordings of the pieces of music;
the audio recordings including sound-wave sampled audio;
the computer program product comprising:
a computer-readable medium, and
software program code on the computer-readable medium, for directing the electronic appliance to:
execute program software for controllably playing the audio recordings of the voice reading the written language text and of the pieces of music, and for displaying the written language text and the pieces of music, the program software supporting an electronic book format;
responsive to user command, play the audio recordings of the voice reading the written language text and of the pieces of music through the audio output;
display the book's written language and music notation content:
  (i) by displaying a first portion of the book's written language and music notation content, the first portion containing a sequence of second portions of the book's written language and music notation content, and
  (ii) by highlighting the second portions of the book's written language and music notation content, in sequence, such that the highlighted second portions advance through the first portion; and
synchronize the successively highlighted second portions with the audio recording as it is played from the audio output.
(2). A computer program product as set forth in (1) above, wherein the electronic book format of the written language and music notation content is EPUB.
(3). A computer program product as set forth in (1) above, wherein the music notation content includes a vector graphics representation.
(4). A computer program product as set forth in (1) above, wherein the software program code for directing the electronic appliance to highlight second portions of the music notation content includes:
software program code for directing the electronic appliance to put a fill in the second portion, and to advance the fill as the successive second portions advance through the first portion.
(5). A computer program product as set forth in (1) above, wherein the software program code for directing the electronic appliance to put the fill in the second portion of the music notation content includes:
software program code for directing the electronic appliance to change the opacity of a pre-existing fill from fully transparent to translucent.
(6). A computer program product as set forth in (1) above, wherein the first portion is a page of the book's written language and music notation content.
(7). A computer program product as set forth in (1) above, wherein the second portion of music notation content is one of:
a measure of music within the first portion of the book's written language and music notation content;
a beat of music, as defined by a time signature of the piece of music; and
a note of music, a duration of the second portion being determined by a rhythmic value of the note of music.
(8). A computer program product as set forth in (1) above, wherein the second portion is one of:
a complete or partial word within the first portion of the book's written language and music notation content;
a complete or partial phrase within the first portion of the book's of written language and music notation content;
a complete or partial sentence within the first portion of the book's written language and music notation content;
a complete or partial paragraph within the first portion of the book's written language and music notation content.
(9). A computer program product as set forth in (1) above, wherein the software program code for directing the electronic appliance to synchronize includes:
software program code for directing the electronic appliance to cause the display to highlight the second portion of the written language and music notation content in synchronization with the audio played from the audio output, the synchronizing being based on data that synchronizes starting and ending points within the audio recordings with the beginnings and ends of each second portion.
(10). A computer program product as set forth in (9) above, wherein the data that synchronizes is in the SMIL format.

(11). A computer program product as set forth in (1) above, wherein the user command interface allows the user to manually jump to any first portion of written language and music notation content, with synchronized playback restarting at the start of the newly selected portion.

(12). A computer program product as set forth in (1) above, wherein the user command interface allows the user to manually jump to any second portion within the currently displayed first portion, with synchronized audio playback restarting at a point corresponding to the start of the newly selected second portion.

(13). A computer program product as set forth in (1) above, wherein the user command interface is a touch screen interface.

(14). A computer program product as set forth in (1) above, wherein the user command interface is a game control interface.

(15). A computer program product as set forth in (1) above wherein the user command interface is a motion control interface.

Although the disclosed embodiments have been described in detail with reference to particular elements and features, persons possessing ordinary skill in the art will appreciate that various modifications and enhancements may be made without departing from the spirit and scope of the claims that follow.

What is claimed is:

1. A method of providing synchronized content to a user, including written language text and representations of one or more pieces of music in notation form with audio synchronization as an electronic book, the method comprising:
   implementing an electronic book file in the EPUB electronic book format, representing:
   (i) an audio recording of a voice reading the written language text, and an audio recording of the one or more pieces of music, the audio recording including soundwave sampled audio;
   (ii) the written language text and music notation content, having elements that can be identified, displayed, and highlighted, the elements representing discrete segments of the written language and music notation content, each of the discrete segments having a beginning and an end; and
   (iii) synchronization data marking beginning and end points in the audio recordings for each element of the written language text and the one or more pieces of music; and
   providing the electronic book file to a user, whereby a user may load the content into a general purpose electronic appliance supporting the EPUB electronic book format, having a graphical display and an audio output;
   whereby the general purpose electronic appliance may be user-operated to play the audio recording of a voice reading the written language text, and the audio recording of the one or more pieces of music according to the EPUB format, and to display the written language text and music notation content according to the EPUB format with synchronization.

2. The method as recited in claim 1, wherein the electronic book format of the implemented electronic book file employs the EPUB Media Overlays format mechanism for controllably playing and displaying.

3. The method as recited in claim 1, wherein the music notation content includes a vector graphics representation.

4. The method as recited in claim 1:
   wherein the implementing the electronic book representing the written language text and music notation content includes:
   creating one or more sheet music files for the one or more pieces of music, in a sheet music editor; and
   exporting the one or more sheet music files as vector graphics representations having elements that can be identified, displayed, and highlighted, the elements representing discrete segments of the one or more pieces of music, each of the discrete segments having a beginning and an end; and
   combining the vector graphics representations of the music notation content with text representations of the written language content; and
   wherein the implementing the electronic book representing the synchronization data includes generating synchronization data to synchronize the audio recordings to the written language text and music notation content, wherein beginning and end points in the audio recordings correspond with the elements of the written language text and music notation content that represent the discrete segments thereof; and
   wherein the method further comprises generating an electronic book file, incorporating the audio recordings, the written language text, and the vector graphics representations.

5. The method as recited in claim 4, wherein, in the exporting the one or more sheet music files, the vector graphics representations have elements identified by a <par> element in SMIL synchronization data, to be displayed and highlighted while the audio recordings are played back.

6. The method as recited in claim 4, wherein, in the exporting the one or more sheet music files, the vector graphics representations have one or more highlight layers containing translucent rectangles, and the exporting the one or more sheet music files includes exporting the vector graphics content for each discrete segment in the one or more sheet music files.

7. The method as recited in claim 4, wherein the audio recording of the one or more pieces of music include sampled audio that represents the sound waves of actual performances of the one or more pieces of music.

* * * * *